(12) United States Patent
Tanaka et al.

(10) Patent No.: US 11,002,753 B2
(45) Date of Patent: May 11, 2021

(54) TEST PIECE STORAGE CONTAINER CONTINUOUS PROCESSING APPARATUS, MEASURING SYSTEM, TEST PIECE STORAGE CONTAINER CONTINUOUS PROCESSING METHOD, AND MEASURING METHOD

(71) Applicant: SYSMEX CORPORATION, Kobe (JP)

(72) Inventors: Teiji Tanaka, Kobe (JP); Satoshi Takai, Kobe (JP); Hirokazu Yamanaka, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 340 days.

(21) Appl. No.: 16/046,057

(22) Filed: Jul. 26, 2018

(65) Prior Publication Data

US 2019/0033333 A1    Jan. 31, 2019

(30) Foreign Application Priority Data

Jul. 28, 2017   (JP) .............................. JP2017-146080

(51) Int. Cl.
   *G01N 35/04*   (2006.01)
(52) U.S. Cl.
   CPC ..... *G01N 35/04* (2013.01); *G01N 2035/0405* (2013.01); *G01N 2035/046* (2013.01); *G01N 2035/0465* (2013.01)
(58) Field of Classification Search
   CPC ............. G01N 2035/046; G01N 35/04; G01N 2035/0406; G01N 33/4875; G01N 35/0099; G01N 2035/0405; G01N 2035/00287
   See application file for complete search history.

(56) References Cited

U.S. PATENT DOCUMENTS

| 2005/0194237 A1* | 9/2005 | Veiner ................. G01N 35/04 |
|---|---|---|
|  |  | 198/619 |
| 2008/0170967 A1* | 7/2008 | Itoh .......................... B67B 7/02 |
|  |  | 422/400 |

FOREIGN PATENT DOCUMENTS

| CN | 101135695 A | * | 3/2008 | ............. G01N 35/04 |
|---|---|---|---|---|
| JP | H09-325152 |  | 12/1997 |  |
| JP | 2018-091773 |  | 6/2018 |  |

* cited by examiner

*Primary Examiner* — Eric S. McCall
*Assistant Examiner* — Timothy P Graves
(74) *Attorney, Agent, or Firm* — Brinks Gilson & Lione

(57) ABSTRACT

A test piece storage container continuous processing apparatus capable of continuously introducing a test piece storage container into a housing and suitably coping with numerous samples. The continuous processing apparatus X is applied to a measuring apparatus Y which removes a test piece P from a test piece storage container B equipped with an opening and closing lid B2 and performs predetermined measurement processing, and further includes an introduction transfer unit 1 for transferring the test piece storage container B introduced from the introduction starting end 11 set outside the housing Y1 of the measuring apparatus Y to a predetermined test piece take-out position in the housing Y1, a lid opening unit 2 for switching the opening and closing lid B2 from a closed state to an open state at the test piece take-out position, and a discharge unit 31 for discharging the test piece storage container B from which the test pieces P have been removed to a discharge port 31, wherein the introduction starting end is set to be accessible from the outside of the housing Y1, and the test piece storage container B is configured to be transferable in one direction from the introduction starting end 11 to the discharge port 31.

18 Claims, 28 Drawing Sheets

TEST PIECE STORAGE CONTAINER CONTINUOUS PROCESSING APPARATUS, MEASURING SYSTEM, TEST PIECE STORAGE CONTAINER CONTINUOUS PROCESSING METHOD, AND MEASURING METHOD

RELATED APPLICATIONS

This application claims priority from prior Japanese Patent Application No. 2017-146080, filed on Jul. 28, 2017, entitled, "Test Piece Storage Container Continuous Processing Apparatus", the entire contents of which are incorporated herein by reference.

BACKGROUND OF THE INVENTION

1. Field of the Invention

The present invention relates to a continuous processing apparatus capable of continuously and sequentially transferring a plurality of introduced test piece storage containers (containers capable of storing test pieces to be tested) to a predetermined position to be subjected to measurement processing, as applied to devices that measure liquid samples such as urine and blood (especially urine samples) in clinical examinations.

2. Description of the Related Art

Test pieces used when measuring a liquid sample such as urine or blood, and particularly a urine sample, in a clinical test are transported to, for example, medical facilities such as hospitals and laboratories stored in large numbers in specially designed test piece bottles (hereinafter, "test piece storage container"), and the test pieces are taken out one by one from such test piece storage containers and supplied to a predetermined measuring apparatus to obtain examination and measurement results related to the health status and the like of the person who provided the liquid sample.

The applicant of the present invention devised a test piece supplying apparatus capable of efficiently taking out a test piece from a container and supplying it to a measuring apparatus in order to speed up measurement and analysis and has put it into practical use (for example, refer to Japanese Patent Application Publication No. H09-325152). According to the measuring apparatus (continuous automatic measuring apparatus) in which such a test piece feeding apparatus is incorporated in a housing as a part of the mechanism, the test piece supplying apparatus can efficiently take out a test piece from the container and use it for measurement/analysis processing, and can realize an increase in the measuring speed and continuous processing performance when processing numerous samples.

Now, in a measuring apparatus (hereinafter referred to as "apparatus") incorporating a test piece feeding apparatus, a plurality of test piece storage containers are set in a housing at a time, and the plurality of test piece storage containers are sequentially moved one by one to a position (test piece take-out position) at which a test piece in the container can be taken out, and subsequently moved to a predetermined standby position after all or a necessary number of test pieces in the container have been removed. As an example of enabling such processing, Japanese Patent Application Publication No. H09-325152 discloses setting a plurality of test piece storage containers on a turntable installed in a housing of the measuring apparatus, and rotating the turntable so that the test piece storage container on the turntable is sequentially moved to an appropriate position. Instead of a turntable, a configuration in which a bottle rack containing a plurality of test piece storage containers is set in a housing of a measuring apparatus is also known.

SUMMARY OF THE INVENTION

In the case of such an apparatus, after the completion of the above process for all the test piece storage containers set on the turntable in the housing, the operator removes the test piece storage container (used test piece storage container) from the housing and sets the next test piece storage container on the turntable in the housing. Even when a bottle rack is used, it is necessary to replace the set in rack units.

In the case of a conventional apparatus, after the operator has once set a plurality of test piece storage containers in the housing using the turntable or the bottle rack, it was impossible to add a new replacement test piece storage container to the inside of the housing until the above processing was complete for all the test piece storage containers within the housing. Since there are cases of the measurement process being stopped once during the process of newly setting a test piece storage container, there seems to be room for improvement in terms of throughput and working efficiency when there are numerous samples.

Although it is conceivable, for example, to increase the number of stored test pieces in each test piece storage container so that measurement/analysis processing can be performed quickly and continuously even when there are numerous samples, in this case it may be impossible to properly perform the process of removing the test pieces one by one from the container, thus leading to a problem in that that high precision and complicated control of the test piece feeding apparatus is required, which results in higher cost of the apparatus. On the other hand, it is also considered possible to deal with cases of numerous samples by increasing the number of test piece storage containers that can be set at one time in the housing However, since it is a prerequisite to set the test piece storage container in a state in which the lid is completely removed in a conventional apparatus, the test pieces of the test piece storage container are exposed to the gaseous atmosphere inside the housing and may degrade due to moisture absorption, and the probability of moisture absorption and deterioration increases as the test piece storage container having a slower movement order to the test piece takeout position is exposed to the atmosphere for a long time.

In order to avoid such a situation among the test piece storage containers set in the housing with the lids removed, a configuration is offered wherein the container positioned at the test piece take-out position has its interior space in an open state on the one hand, and the other containers waiting elsewhere have the upper opening of the container closed with a dedicated holding lid provided on the apparatus side to prevent the inner space of the container from being exposed to the atmosphere.

However, the test pieces in the test piece storage container which has a slow takeout order increases the concern of deterioration due to moisture absorption unless the holding lid is as air tight as the screw lid. It also is necessary to provide the same number or more of the holding lids in the housing as the number of the test piece storage containers that can be set at predetermined locations in the housing, such that if the number of settable test piece storage containers is increased, the number of holding lids provided on the apparatus side must also increase, which complicates the structure of the apparatus, increases the cost, and increases the problematic work such as maintenance and replacement of the holding lids. The space occupied by the holding lids and the space occupied by the mechanism related thereto increases within the limited space in the housing, which is problematic in that it causes an increase in the size of the housing.

In view of the above, the applicant of the present invention has proposed a test piece storage container which can be used in place of a conventional test piece storage container and can temporarily store a test piece therein until the device is set in the apparatus, and further devised a tubular body fitted with an opening and closing lid for which a patent application (Japanese Patent Application No. 2016-236421) has been filed. With such a test piece storage container, there is no need to provide a holding lid on the apparatus side, and it is possible to avoid exposure to the atmosphere by test pieces in the container at a waiting position by setting the opening and closing lid of the container positioned at the test piece take-out position to the open state and by setting the opening and closing lid of the other waiting containers to the closed state.

However, even when such a test piece storage container is applied, the maximum number of test piece storage containers that can be set at a time in the limited space inside the housing, ultimately depends on the size of the housing, which leads to enlargement of the housing in order to increase the number of test piece storage containers that can be set at one time in the housing.

In view of these points, the present invention provides a test piece storage container continuous processing apparatus capable of continuously introducing a test piece storage container into a housing based on a never before conceived and novel technical concept, and can suitably cope with cases of numerous samples.

That is, the present invention relates to a continuous processing apparatus applied to a measuring apparatus for taking out a test piece from a test piece storage container provided with an openable lid and performing a predetermined measurement process.

Here, a reagent layer may be provided on one end side of one surface of a stick made of elongated paper or plastic and the other end side may be set as a holding part, for example, as the test piece. This test piece is used for measurement of a liquid sample (liquid to be examined) such as urine, blood or the like), and a plurality (for example, 10 or more pieces) of these test pieces are housed within the interior space of a test piece storage container in an upright standing posture or posture close to the upright posture.

A continuous test piece storage container continuous processing apparatus according to the invention includes an introduction transfer unit for transferring a test piece storage container introduced from a predetermined introduction starting end set outside the housing of the measuring apparatus to at least a predetermined test piece take-out position, a lid opening unit for switching the opening and closing lid from a closed state to an open state at the test piece take-out position or a predetermined position on the upstream side from the test piece take-out position in the introduction transfer direction of the test piece storage container by the introduction transfer unit, and a discharge unit for discharging a test piece storage container from which all or a predetermined number of test pieces have been removed from the internal space of the housing to the discharge port, wherein access to the introduction starting end of the introduction transfer unit is set to be accessible from the outside of the housing, and the test piece storage container can be transported in one direction from the introduction starting end to the discharge port. Here, the invention includes both a configuration in which the "predetermined test piece take-out position" is set at a predetermined position within the housing, and a configuration in which the "predetermined test piece take-out position" is set at a predetermined position outside the housing.

The continuous test piece storage container continuous processing apparatus according to the present invention has the introduction starting end set outside the housing of the measuring apparatus, and the introduction starting end is set to be accessible from the outside of the housing, such that the operator can introduce the test piece storage container from the introduction starting end. According to the test piece storage container continuous processing apparatus of the present invention, since the test piece storage container is configured to be transferred in one direction from the introduction starting end to the discharge port, the test piece storage container that has been introduced from the introduction starting end can be subjected to an introduction transfer process for transferring at least to a predetermined test piece take-out position by the introduction transfer unit, a lid opening process for switching the opening and closing lid from a closed state to an open state at the test piece take-out position or a predetermined position on the upstream side from the test piece take-out position in the introduction transfer direction of the test piece storage container by the introduction transfer unit, a discharge process for discharging the test piece storage container from which all or a predetermined number of test pieces are removed from the internal space to the discharge port by the discharge unit, wherein, continuous operation can be performed insofar as there is a test piece storage container on the transfer line of the introduction transfer unit, in other words, as long as a test piece storage container continues to be supplied to the introduction starting end. The test piece storage container also can be replaced from the introduction starting end even during the measurement process of the measuring apparatus.

According to the test piece storage container continuous processing apparatus of the invention, problems that may occur in a conventional apparatus, that is, problems such as the impossibility of setting a new test piece storage container in the housing until the processing for all the test piece storage containers is completed after a plurality of test piece storage containers are set in the housing of the measuring apparatus by the operator, and the time period during which a test piece storage container cannot be provided to the measurement processing during the process of removing the test piece storage container from the inside of the housing and setting the next test piece storage container can be solved to improve processing capacity and work efficiency.

The test piece storage container continuous processing apparatus according to the invention, in which the introduction starting end is set outside the housing of the measuring apparatus, also is advantageous compared to conventional test piece storage container processing apparatuses since the size of the housing need not be enlarged in order to increase the number of test piece storage containers that can be set in the housing.

In the test piece storage container continuous processing apparatus according to the invention, since the test piece storage container with the opening and closing lid to be processed is configured to switch the opening and closing lid from the closed state to the open state at the test piece take-out position or a predetermined position on the upstream side in the transfer direction of the test piece storage container moved by the introduction transfer unit from the test piece take-out position, it is possible to maintain the lid sealed state on the test piece storage container until the test piece storage container arrives at the test piece take-out position or a predetermined position on the upstream side of the test piece take-out position, and it is possible to prevent/inhibit the situation of the test piece inside the container being exposed to the atmosphere and deteriorating due to moisture, and it is not necessary to provide a dedicated holding lid inside the housing of the measuring apparatus, thereby simplifying the structure. By setting the position where the lid opening unit switches the lid from the closed state to the open state at the test piece take-out position, it is possible to minimize the time the test piece is exposed to the atmosphere.

In the invention, since the test piece storage container can be transported in a non-circulatable way in one direction from the introduction starting end to the discharge end, the travel path that the test piece storage container follows from the introduction starting end to the discharge end is simplified and a smooth transfer process can be realized.

As a preferred example of the introduction transfer unit in the invention, there is provided a main transfer unit which is arranged in a housing and which transfers the test piece storage container to at least the test piece take-out position, and an introduction transfer unit having an introduction unit which transports the test piece storage container introduced from the introduction starting end to a transport start position of the test piece storage container by the main transfer unit. In particular, in the invention, the main transfer line of the test piece storage container by the main transfer unit is set to a line extending in the horizontal direction, and the introduction line of the test piece storage container by the introduction unit is set in a line extending in the predetermined direction including at least a component in the height direction from the introduction starting end toward the inside of the housing and continuing to connect the terminal end to the starting end of the main transfer line. In the present invention, when adopting a configuration in which the "predetermined test piece takeout position" is set at a predetermined position outside the housing, it is also possible to provide a part or the entirety of the main transfer unit outside the housing.

When the measuring apparatus is configured to take-out the test piece from the container body of the test piece storage container which is inclined by a predetermined angle at the test piece take-out position, a smooth and stable transfer process can be realized if the main transfer unit of the invention inclines the test piece storage container at a predetermined angle compared with a mode in which the posture of the test piece storage container is changed during the process of transferring the test piece storage container by the main transfer unit.

In the present invention, the main transfer unit is provided with a posture change unit, as a discharge unit, for changing the test piece storage container from a posture inclined by a predetermined angle to a vertical posture when discharging the test piece storage container that has reached the discharge preparation position from the discharge port when the test piece storage container is transferred to the discharge preparation position set even farther on downstream side in the transport direction than the test piece take-out position. With such a configuration, it is possible to maintain the test piece storage container at the test piece take-out position in the inclined posture, and the test piece storage container is changed from the inclined posture to the vertical posture by the posture change unit at the discharge preparation position, and it also is possible to set the opening size of the discharge port to the minimum size according to the planar shape of the test piece storage container so as to fall from the discharge port to the collection area, and in order to drop the test piece storage container in the inclined posture the opening size can be set slightly smaller than the required opening size of the discharge port. When the opening size of the discharge port is set as small as possible within the range allowing passage of the test piece storage container relative to the discharge port, the probability that the test piece storage container is caught on the opening edge of the discharge port during discharge processing is lower in the inclined posture than in the vertical posture.

In the present invention, if the introduction unit includes a primary introduction unit for moving the test piece storage container introduced at the introduction starting end by its own weight and a secondary introduction unit that lowers the test piece storage container that has been moved by the primary introduction unit to the transport start position, it is possible to simplify the structure by setting the primary introduction part as a slide passage which does not need to be configured by a mechanical mechanism, and it is relatively easy to set the path length of the slide passage to a length that allows numerous test piece storage containers to be stocked. Therefore, when adopting the design in which the majority of the route length of the entire introduction unit is occupied by the primary introduction unit which is a relatively simple configuration and the remaining route length is occupied by the secondary introduction unit, the path for moving the test piece storage container at the introduction unit by its own weight is relatively long compared with the configuration in which the path for moving the test piece storage container by a mechanical mechanism is relatively long at the introduction unit, such that it is possible to realize a simplification of the mechanism required for moving the test piece storage container at the introduction unit.

In the case where the introduction unit is configured by the primary introduction unit and the secondary introduction unit, as the second introduction part, it is preferable to use as the secondary introduction unit an elevator mechanism for lowering the test piece storage container by an elevator system to the transport start position of the test piece storage container by the main transfer unit. The elevator mechanism makes it possible to smoothly and appropriately perform the process of transferring the test piece storage container by the secondary introduction unit.

In the present invention, when an opening and closing lid is provided with a tubular part which can be fitted to the upper end part of the container body and a lid main body which is rotatably connected to the tubular portion via a hinge shaft, the lid opening unit of the invention also may press the protrusion protruding in a direction of away from the center portion of the lid body from the hinge shaft in the opening and closing lid which is in the closed state at the test piece take-out position insofar as it switches the opening and closing lid from the closed state to the open slate.

A test piece storage container continuous processing apparatus according to the present invention functions as bottle changer capable of switching a test piece storage container that has arrived at the test piece take-out position for is a subsequent test piece storage container one after another by the primary introduction unit, secondary introduction unit, main transfer unit, lid opening unit, and discharge unit. Such a test piece storage container continuous processing apparatus can be assembled on a unit basis by, for example, partially modifying an existing measuring apparatus while following the structure of the conventional measuring apparatus in a possible range to perform a continuous operation in which predetermined processing is successively performed on the test piece storage containers continuously introduced from the starting end.

According to the present invention, a test piece storage container can be moved to a test piece take-out position, the lid of the test piece storage container can be opened at the test piece take-out position or a predetermined position on the upstream side in the transfer direction from the test piece take-out position, and a test piece in the container can be removed in a process of transferring a test piece storage container with an opening and closing lid introduced from an introduction starting end set outside the housing along a continuous transfer path from the introduction starting end to the discharge port. According to the present invention, the trouble of replacing the test piece storage container with a plurality of set units can be eliminated, and it is possible to introduce a plurality of test piece storage containers continuously in the time period in which a plurality of test piece storage containers are exchanged in set units compared to a conventional apparatus which sometimes temporarily stops the test piece take-out process, that is, it is possible to provide a novel useful apparatus functioning as a continuously loading bottle changer capable of moving the introduced test piece storage container to a predetermined collection area along a transfer path, and test pieces can be continuously supplied according to the number of samples even when there are numerous samples.

DETAILED DESCRIPTION OF THE PREFERRED EMBODIMENTS

Hereinafter, an embodiment of the present invention will be described with reference to the drawings.

Figure 1:
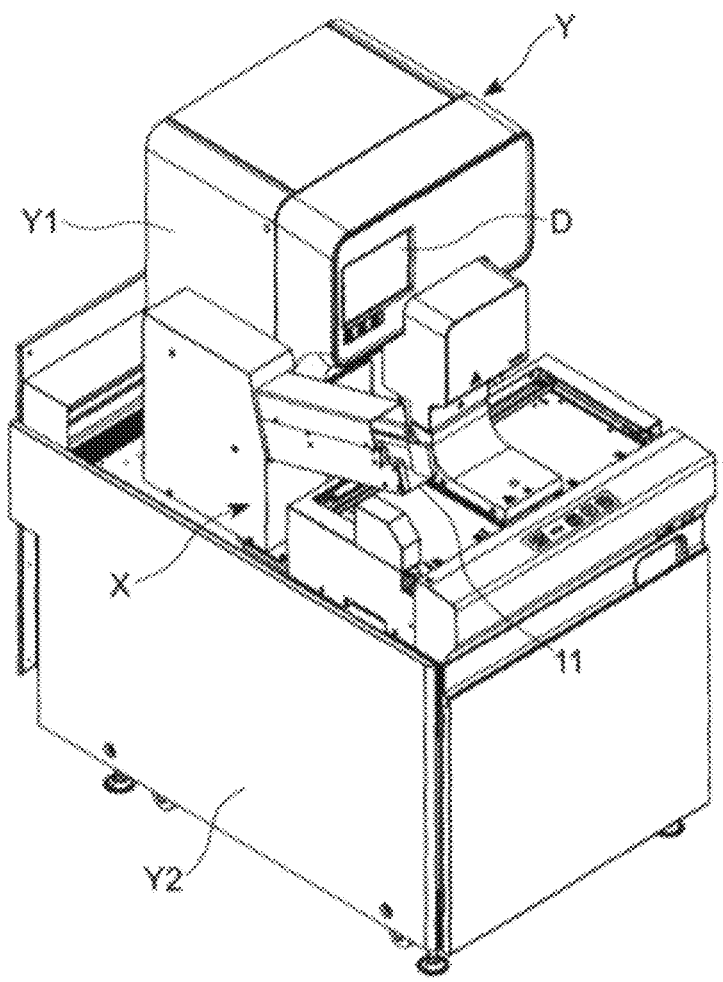
FIG. 1 is an overall perspective view of a measuring apparatus to which a test piece storage container continuous processing apparatus according to an embodiment of the present invention is applied.
Figure 2:
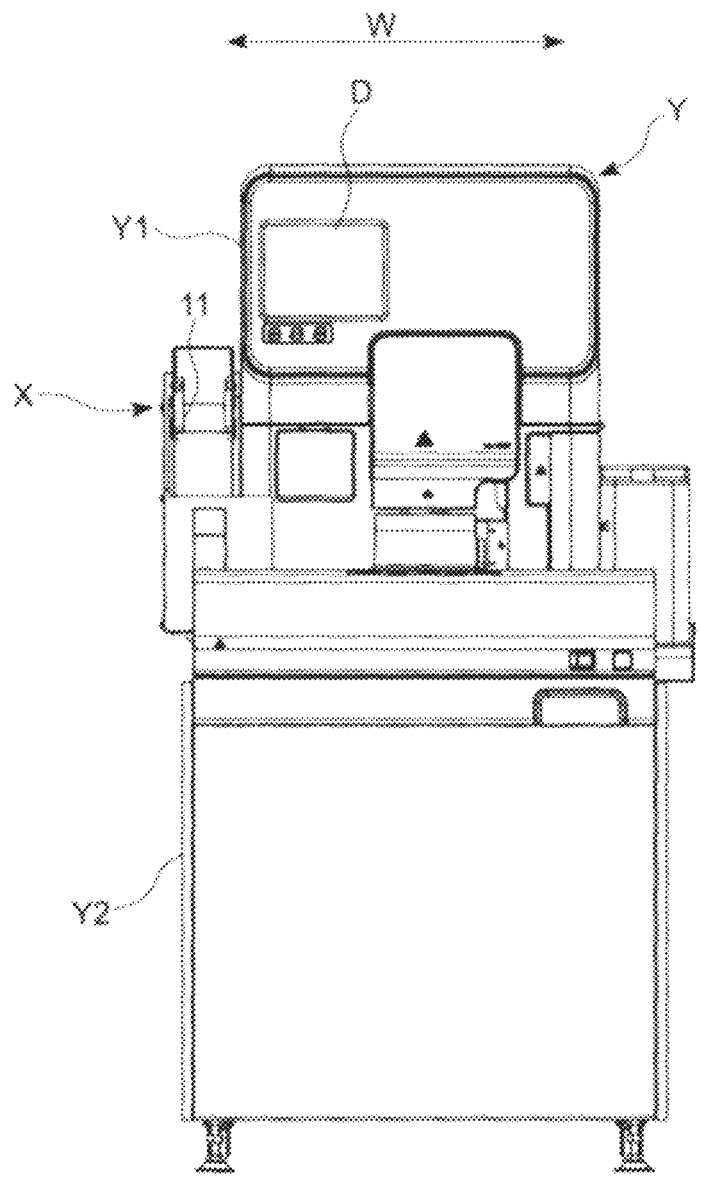
FIG. 2 is a front view of the measuring apparatus shown in FIG. 1.

The test piece storage container continuous processing apparatus X according to the present embodiment is applied to a measuring apparatus Y as shown in FIGS. 1 and 2, and is an apparatus that functions as a continuous loading bottle changer capable of continuously introducing a plurality of test piece storage containers B. The test piece storage container continuous processing apparatus X of this embodiment has, for example, the test piece storage container B shown in FIG. 3 as a processing target object.

Figure 3A:
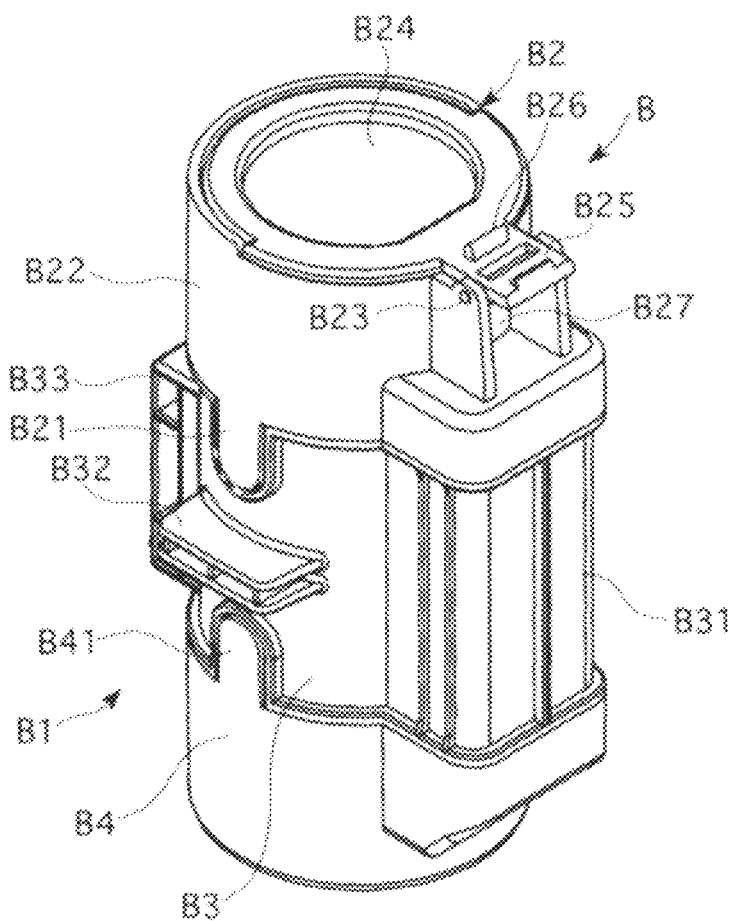
FIGS. 3A and 3B are views showing an example of a test piece storage container and a test piece used in the same embodiment.
Figure 3B:
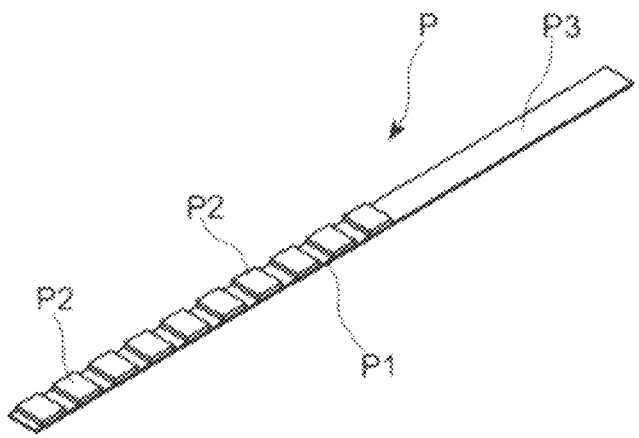

As shown in FIG. 3A, the test piece storage container B includes a container body B1 having an internal space capable of storing a plurality of test pieces P, and an opening and closing lid B2 for closing the top of the internal space so as to be opened and closed, and is capable of storing the test piece P in the internal space as shown in the drawing. As shown in FIG. 3B, the test piece P used in the present embodiment is mainly configured by an elongated stick P1; a plurality of reagent layers P2 are provided on one end side of the stick P1, and the grip part P3$t$ is provided on the other end side. The stick P1 is, for example, made of a synthetic resin, and the surface provided with the reagent layer P2 is treated as a front surface. The name of the test piece P, a logo mark, or the like also is printed on a part of the grip part P3.

In the present embodiment, the container body B1 is configured by a cylindrical body B3 having a bottomless uncovered inner space open in a vertical direction coincident with the axial direction (longitudinal direction), and a lower lid B4 attachable to the lower end of the body B3. With the lower lid B4 mounted on the body B3, an inner space opened only upward is formed, and the guide protrusion B41 of the lower lid B4 is fitted into the lower guide groove of the body B3, so that in the mounted state it is possible to prevent/suppress a situation in which the lid B4 unintentionally rotates in the circumferential direction of the body B3.

On the outer peripheral surface of the body B3 are provided a desiccant storage part B31 capable of storing a desiccant, a guide flange B32 which can be fitted with a slight play at on a guide rail 61 of the introduction unit 5 (to be described later), and a pressed part B33 which is pressed by a pressing part (lever 41) of a main transfer unit 4 which will be described later. The desiccant storage part B31, the guide flange B32, and the pressed part B33 are set to protrude or bulge outward of the body B3 more than the other parts. By providing such an irregularly shaped parts on the outer peripheral surface of the body B3, when setting a plurality of test piece storage containers B and when inputting to the introduction starting end 11 of the continuous processing apparatus X or the like, it is possible to align the irregular shaped parts by their marks or the irregularly shaped parts can be inserted in a direction suitable for the movement process by the continuous processing apparatus X. The internal space of the desiccant containing part B31 communicates with a space in which the test piece P is stored by an appropriate ventilation hole (not shown), and by storing the desiccant in the desiccant containing part B31, respectively, it is possible to maintain the humidity of the space in which the test piece P is stored to a predetermined value or less so as to prevent deterioration and failure of the test piece P due to moisture. In the present embodiment, a pair of guide flanges B32 are provided at 180° pitch so as to face each other in the radial direction of the body B3, and one guide flange B32, desiccant containing part B31, the other guide flange B32, and the pressed part B33 are arranged in this order at predetermined intervals.

The opening and closing lid B2 is in an open state (refer to FIG. 16 to be described later) in which the fitting mode relative to the body B3 is the same as that of the lower cover B4, and can be changed between an open state (refer to FIG. 16 to be described later) in which the internal space can be opened upward and a closed state in which the internal space can be closed and attached to the body B3. With the opening and closing lid B2 mounted on the body B3, the guide protrusion B21 of the opening and closing lid B2 is fitted into the upper guide groove of the body B3, whereby the unexpected rotation of the opening and closing lid B2 in the circumferential direction of the body B3 in the attached state can be prevented/suppressed. In the present embodiment, the entire opening and closing lid B2 is not of the type that opens and closes with respect to the body B3, rather the opening and closing lid B2 is a type configured so that the lid body 24 which is in a connected state is rotatable via a hinge shaft B23 to a tubular part B22 mounted to a body B3.

Figure 16:
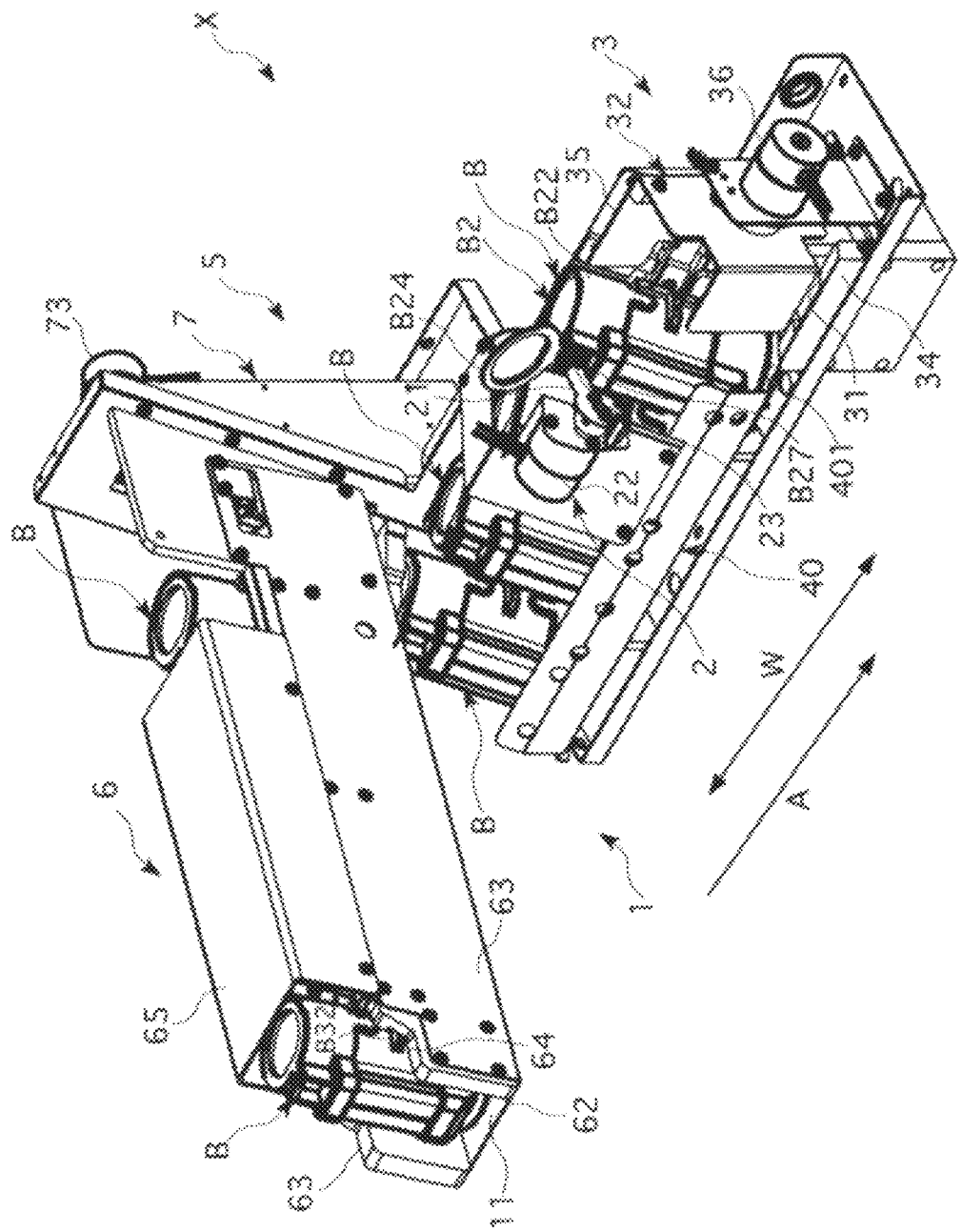
FIG. 16 is a view corresponding to FIG. 15 showing the lid opening unit al the end of the lid opening process.

Then, the lid body B24 rotates around the hinge shaft 1323 by a predetermined operating force applied to the opening and closing lid B2 in the closed state shown in FIG. 3, and more specifically, an operating force presses downward on the protrusion B25 of the lid main body B24 projecting outward from the hinge shaft B23 of the lid body B24, such that the internal space of the test piece storage container B is opened upward as shown in FIG. 16 to be described later. In the present embodiment, "the opening and closing lid B2 is in the open state" means "the test piece P stored in the internal space can be taken out", and includes a state in which the entire internal space is opened upward, or a state in which a part of the internal space is opened. In order to bring the opening and closing lid B2 in the open state to the closed state, it is necessary to stop the operating force (operating force to positively switch from the closed state to the open state) to the lid main body B24, and is sufficient to positively switch the opening and closing lid B2 from the open state to the closed state. By temporarily removing the lower lid B4 from the body B3, the inner space of the body B3 becomes a space opened downward, and the test piece P can be resupplied/replenished to the inner space of the body B3 through this lower opening and the test piece P can be discharged and discarded from the internal space of the body B3 after a predetermined process or the like. Therefore, as compared with a container in which the internal space is set to be openable only upward, options for taking in and out of the test piece P with respect to the internal space are increased, and usability can be expected to be improved. Not only replenishing the test piece P, also replacing the desiccant in the desiccant storage part B31 can also be performed by temporarily removing the lower lid B4 from the body B3. Depending on the packaging form of the test piece P, replenishment of the test piece P and replacement of the desiccant can be performed by temporarily removing the opening and closing lid B2 (specifically, the tubular part B22) attached to the body B3 from the body B3.

Such a test piece storage container B is suitably used, for example, in a medical facility (hereinafter referred to as "apparatus introduction site") into which an apparatus capable of performing a measurement process using, for example, the test piece P is introduced. Although it is assumed that the test piece storage container B accommodates a new test piece P and is reused after completion of the measurement process, it also can be designed to be discarded after one use.

If the test piece P which has been stored or wrapped in the storage container or packaging material during the transport process is transferred to the internal space of the above-mentioned test piece storage container B after the point of delivery to the apparatus installation location without using the above-mentioned test piece storage container B during the transport process to the installation location, dust and fiber scraps that may be generated by rubbing of the test piece P during transportation at the time of transfer can be removed and failure to remove the test piece P can be avoided. By adopting such a usage mode, it becomes possible to repeatedly use the test piece storage container B at the installation site.

Each of the parts configuring the test piece storage container B described above is an integrally molded product made of a synthetic resin, and can be mass-produced using a predetermined mold. ABS (acrylonitrile•butadiene•styrene resin), PC (polycarbonate), PE (polyethylene) and the like can be cited as the molding material of each part.

When loading the opening and closing lid B2 on the body B3 of the test piece storage container B consisting of the above parts, the inner peripheral surface of the tubular part B22 of the opening and closing lid B2 and the upper end side covering region of the body B3 are brought into sliding contact with each other achieving an increased degree of sealing by inserting the tubular part B22 of the opening and closing lid B2 from above the body B3 so as to cover a predetermined area (upper end side covering area) including the upper end part of the body B3. Note that the procedure of attaching the lower lid B4 to the body B3 can be performed in accordance with the procedure of attaching the opening and closing lid B2.

The test piece storage container B according to the present embodiment is configured to have selectable mounting states of a mounted state in which the lower lid B4 is attached to the lower end part of the body B3 and the opening and closing lid B2 is attached to the body B3, wherein the lower cover B4 is attached to the lower end part of the body B3 and the upper end part of the body B3 has the same form as the lower lid B; and a mounted state in which the upper lid (not shown) is usable in a posture in which the lower lid B4 is attached inverted.

The test piece storage container continuous processing apparatus X of the embodiment takes all or a predetermined number of test pieces P one by one from the container body B1 of the test piece storage container B of the opening and closing lid type, and performs predetermined measurement processing which is applied to the measuring apparatus Y, and performs a plurality of processes including a process of transferring the test piece storage container B introduced into the housing Y1 of the measuring apparatus Y to a predetermined test piece take-out position from which the test piece P can be removed from the container body B1.

A test piece take-out unit (pick-up mechanism) for removing the test pieces P one by one from the container body B1 of the test piece storage container B which has reached a predetermined test piece take-out position, and a known basic operation and processing procedure of a measuring unit for measuring a liquid sample, particularly a urine sample, using the test piece P taken out from the container body B1 can be used/utilized in the measuring apparatus Y. These test piece take-out unit and measuring unit are arranged inside the housing Y1 of the measuring apparatus Y.

Figure 4:
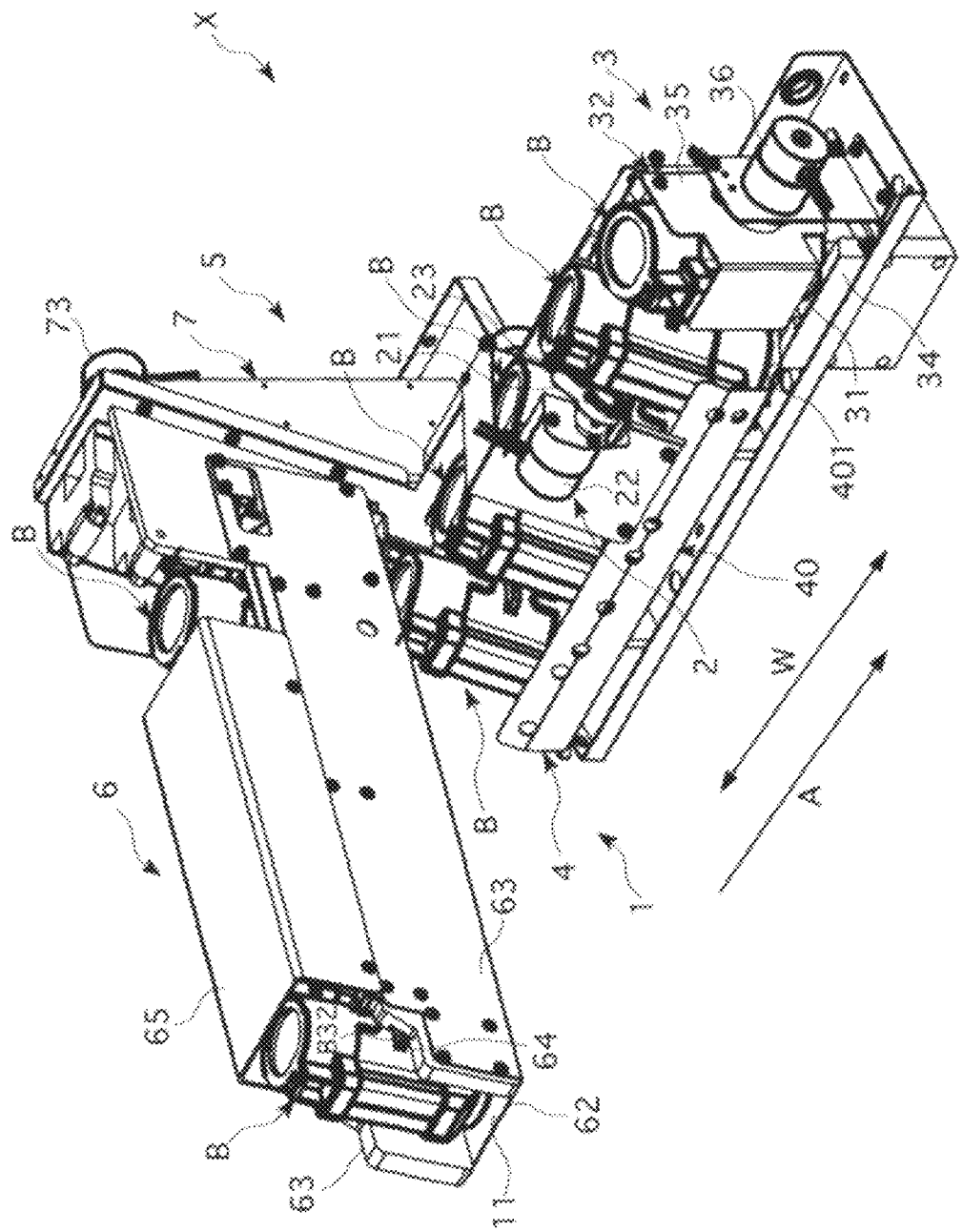
FIG. 4 is an overall perspective view partially showing the test piece storage container continuous processing apparatus according to the same embodiment.

As shown in FIGS. 1, 2 and 4, the test piece storage container continuous processing apparatus X according to the present embodiment is provided with an introduction transfer unit 1 for transferring the test piece storage container B introduced from a predetermined introduction starting end 11 set outside the housing Y1 of the measuring apparatus Y to at least a predetermined test piece takeout position in the housing Y1, a lid opening unit 2 for switching the opening and closing lid B2 from the closed state to the open state at the test piece take-out position, and a discharge unit 3 for discharging the test piece storage container B from which the whole or a predetermined number of test pieces P have been removed from the container body B1 to the discharge port 31, wherein the test piece storage container B can be moved from the introduction starting end 11 to the discharge port 31 along a one-way transfer path (a first introduction line L6, a second introduction line L7, and a main conveyance line L4 to be described later) to a predetermined discharge port 31.

As shown in FIGS. 5 to 14, the introduction transfer unit 1 is provided in the housing Y1 and has at least a main transfer unit 4 for transferring the test piece storage container B to at least the test piece take-out position along a straight main transfer line L4 (see FIG. 13), and an introduction unit 5 for transferring the test piece storage container B introduced from the introduction starting end 11 to the starting end of the main transfer line L4 (the transfer line of the test piece storage container B by the main transfer part 4).

The introduction unit 5 is provided with a primary introduction unit 6 (slide passage) for moving the test piece storage container B introduced from the introduction starting end 11 by its own weight toward the terminal end of the first introduction line L6 set lower than the introduction starting end 11 along the primary introduction line L6 (see FIG. 9) having the introduction starting end 11 opening toward the outside as an entrance (starting end), and 1 second introduction unit 7 (descent passage) for lowering the test piece storage container B having passed through the terminal end of the first introduction line L6 to the starting end of the main transfer line L4. The starting end of the main transfer line L4 corresponds to the "transport start position of the test piece storage container by the main transfer unit" of the present invention.

As shown in FIGS. 1, 2, and 5 to 9, the primary introduction unit 6 is arranged outside the housing Y1 of the measuring apparatus Y, and in the region outside one side surface of the housing Y1 a rail 61 is disposed in an inclined posture in which the height direction decreases from the front to the back of the measuring apparatus Y. Here, the measuring apparatus Y is often operated in a state in which a plurality of apparatuses are arranged side by side in the width direction W of the apparatus Y at the installation site of a device such as a hospital; in the present embodiment, a configuration is adopted in which a part of the continuous processing apparatus X including the primary introduction unit 6 is arranged in a region outside one side surface of the housing Y1 in order to effectively utilize the gap (dead space) between the housings Y1 among the measuring apparatuses Y arranged in the width direction W.

Figure 5:
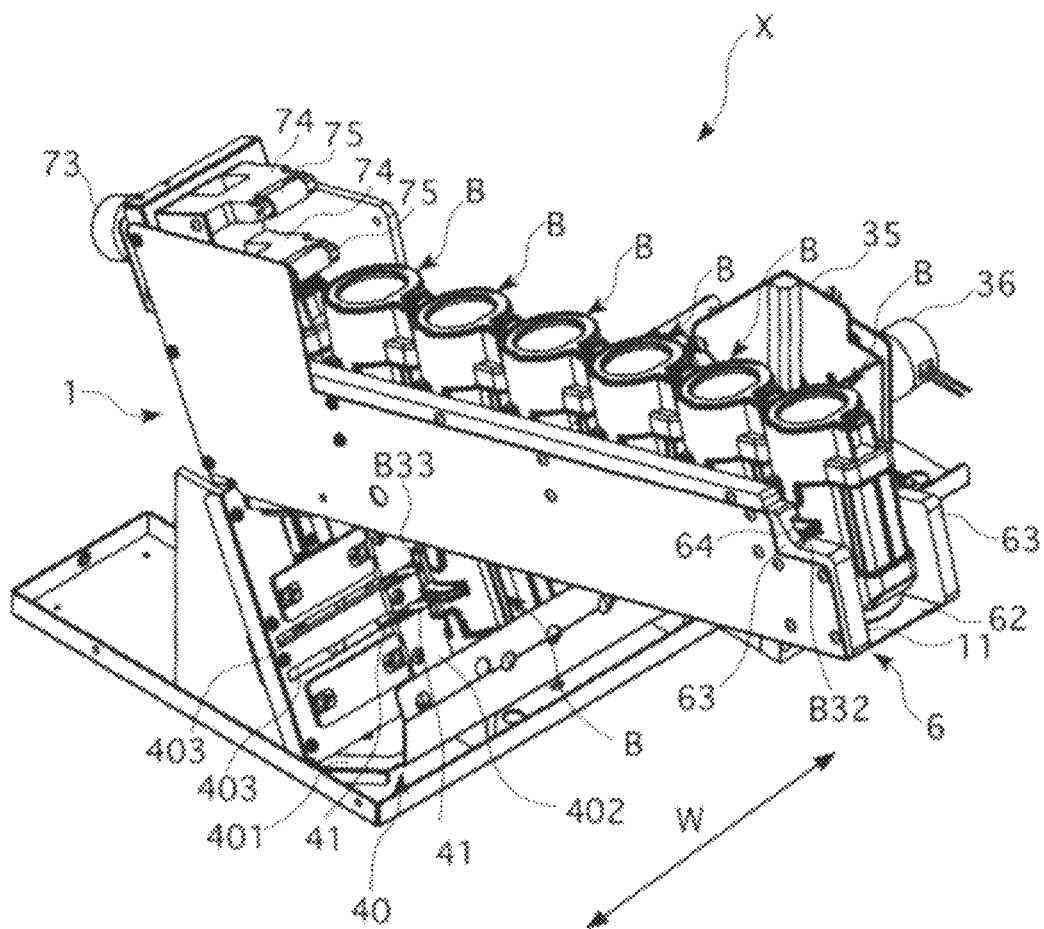
FIG. 5 is a perspective view partially showing the introduction unit of the same embodiment.

The rail 61 includes a rail base 62 and a pair of right and left rail main bodies 63 arranged on both sides of the rail base 62. Each rail main body 63 has an inwardly facing surface (a surface on which the rail main bodies 63 mutually face each other), and a guide rail groove 64 in which the guide flange part B32 of the test piece storage container B is accommodated. In this embodiment, when sliding the guide flange part B32 along the guide rail groove 64, the height position of the guide rail groove 64 is set so that the bottom surface of the test piece storage container B floats from the rail base 62 (refer to FIG. 8). In particular, the rail main body 63 having the guide rail groove 64 is formed of a material excellent in abrasion resistance, sliding property and workability, for example, polyacetal (POM). The inclination angle of the rail 61 can be set to an appropriate value, and in the present embodiment it is set to 15 degrees. A rail cover 65 is provided above the rail body 63 (see FIG. 8), and the entire rail 61 is set in a tubular (tunnel-like) configuration in which only the introduction starting end 11 is open to the outside. In FIG. 5, the rail cover 65 of the primary introduction unit 6 is omitted, and in FIG. 6, one of the rail bodies 61 in FIG. 5 is further omitted.

According to the primary introduction unit 6 configured by the rail 61, when the operator introduces (inserts) the test piece storage container B from the introduction starting end 11, the test piece storage container B has the guide collar part B32 moves by its own weight by sliding along the inside of the guide rail groove 64 toward the terminal end of the rail 61. The primary introduction line L6 (see FIG. 9), which is the introduction line of the test piece storage container B by the primary introduction unit 6, is continuous with the secondary introduction line L7 which is the introduction line of the test piece storage container B by the second introduction unit 7 described next.

Figure 6:
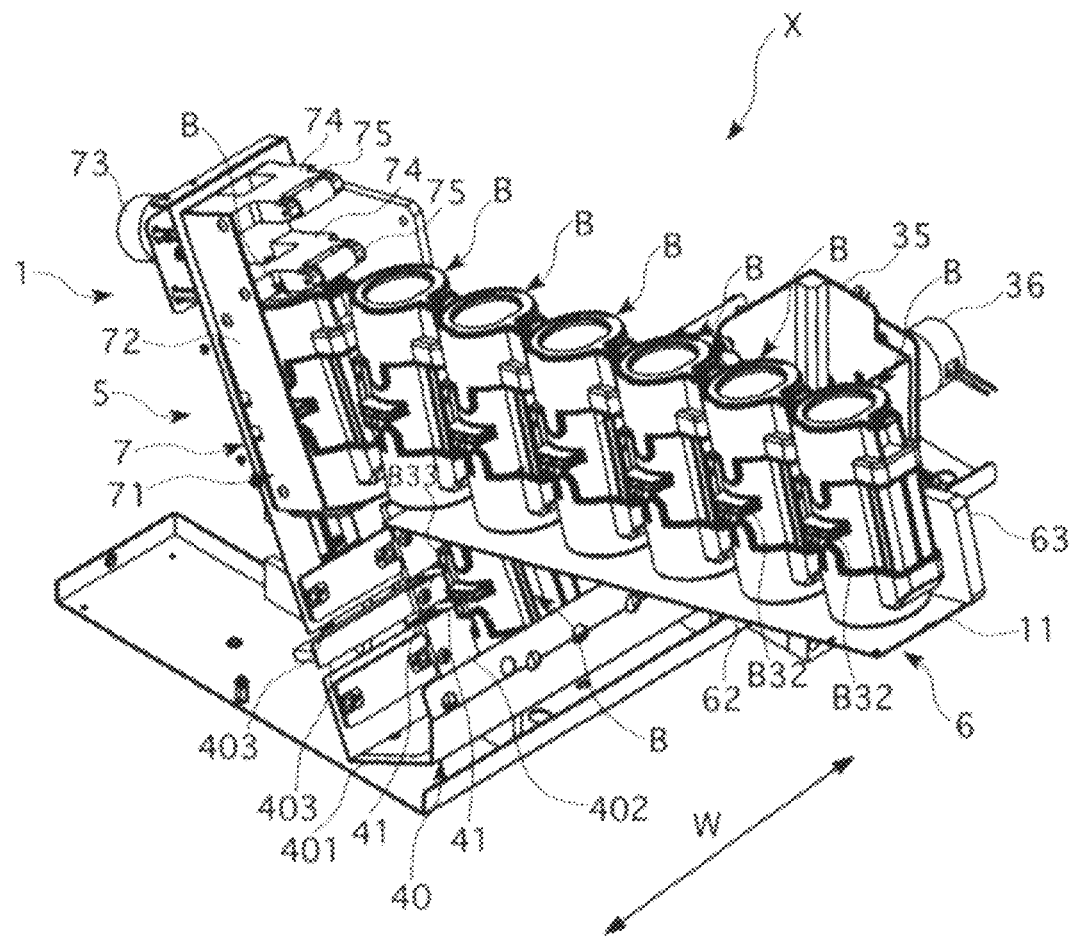
FIG. 6 is a view corresponding to FIG. 5 showing an introduction unit in which part of a rail is omitted.
Figure 7:
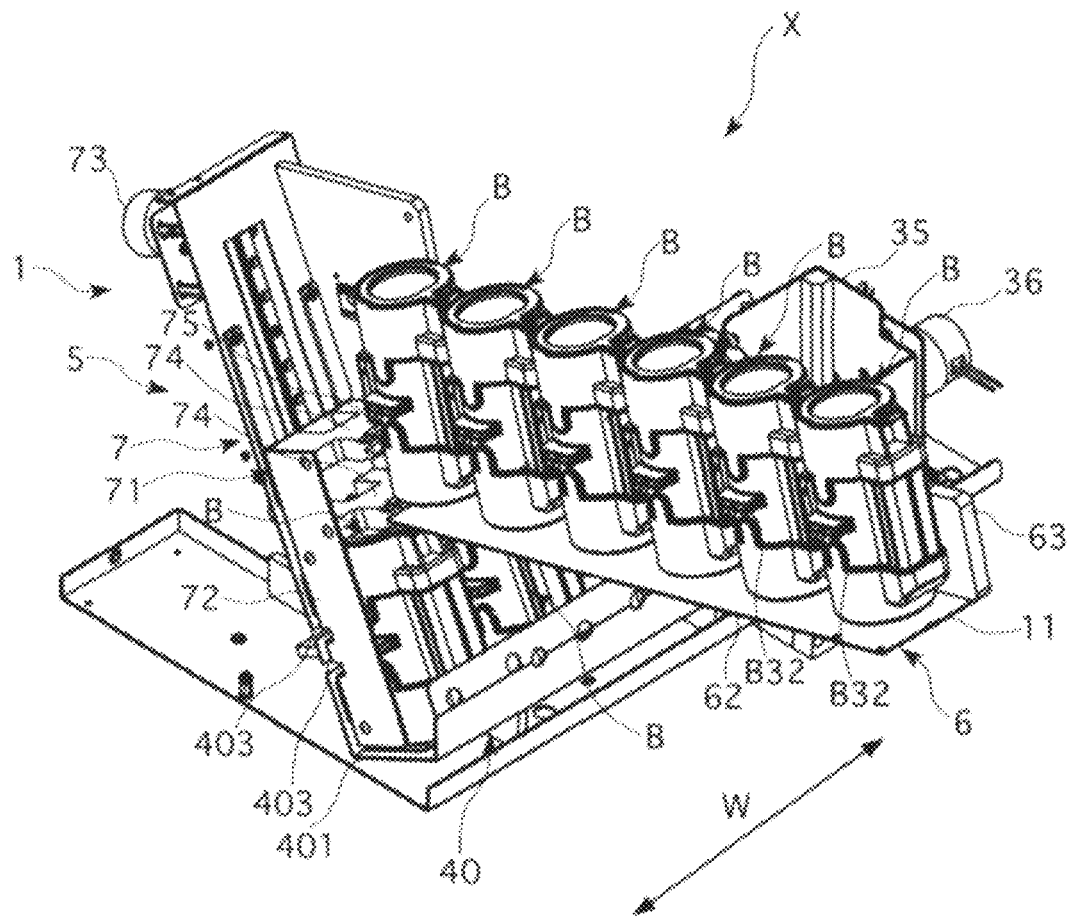
FIG. 7 is a view showing a state in which the transfer case in the same embodiment is in a lower position in correspondence with FIG. 6.
Figure 10:
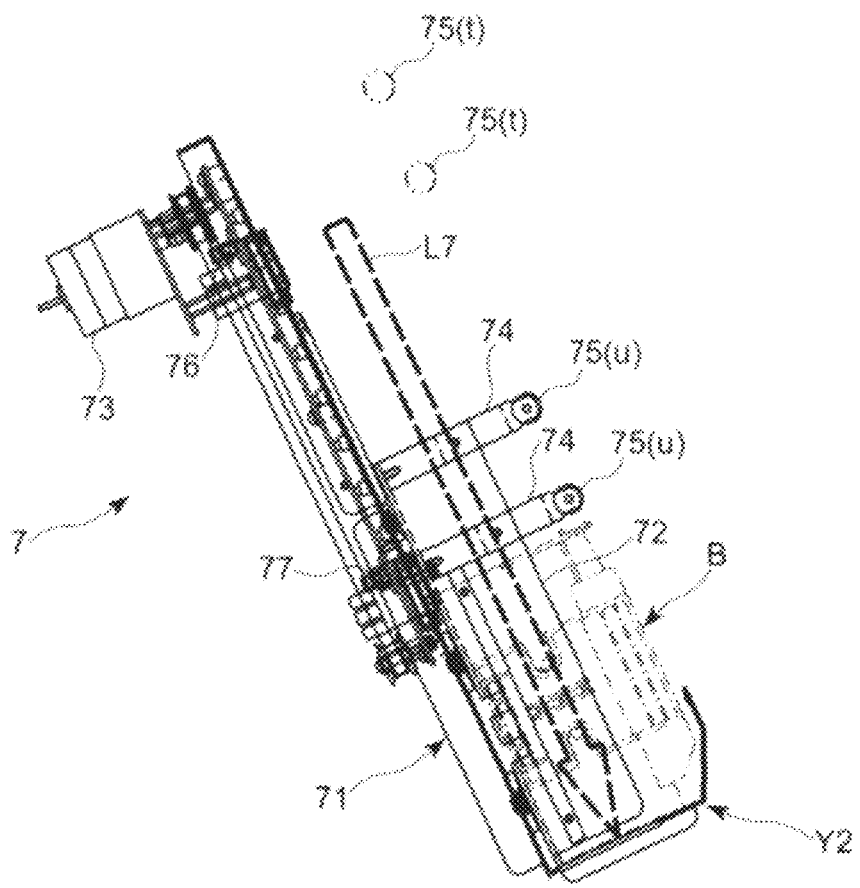
FIG. 10 is a side view partially omitting a secondary introduction unit of the same embodiment.

As shown in FIGS. 6, 7, and 10, the secondary introduction unit 7 receives the test piece storage container 13 that has passed through the terminal end of the primary introduction line L6, and is provided with an elevator mechanism 71 for lowering the received test piece storage container B to the starting end of the main transfer line L4 in an elevator system. The elevator mechanism 71 includes a transfer case 72 for receiving the test piece storage container B, and an elevator drive motor 73 for moving the transfer case 72 up and down. In the present embodiment, a stepping motor is used as the elevator drive motor 73.

The transfer case 72 moves up and down between an upper position (see FIG. 6) at which the test piece storage container B that has passed through the first introduction unit 6 can be received, and a lower position at which the received test piece storage container B can be delivered to the starting end of the main transfer line L4 (see FIGS. 7 and 10). The measuring apparatus Y of the present embodiment is configured to remove the test piece P from the container body B1 of the test piece storage container B which is inclined by a predetermined angle at the test piece take-out position. The elevator mechanism 71 of the present embodiment, at the upper position, receives the test piece storage container B in an inclined posture of a predetermined angle suitable for test piece take-out processing (hereinafter referred to as "inclined posture"), and the test piece storage container B is set to descend to the lower position while maintaining the inclined posture. In the present embodiment, the transfer case 72 is set to an appropriate shape in order to smoothly perform the process of receiving the test piece storage container B at the upper position on the transfer case 72 and the process of transferring the test piece storage container B from the transfer case 72 to the main transfer line L4 at the lower position.

The secondary introduction unit 7 according to the present embodiment also is provided with a stopper 74 to prevent a subsequent test piece storage container B that has reached the vicinity of the terminal end of the primary transfer line L1 from accidentally falling into the vertical movement area of the transfer case 72 during the descent movement from the upper position to the lower position and during the upward movement from the lower position to the upper position of the transfer case 72. The stopper 74 is provided with a support roller 75 that moves up and down integrally with the transfer case 72 and rolls while being attached to a subsequent test piece storage container B while the transfer case 72 is moving up and down (FIG. 6, 7 and FIG. 10). In the present embodiment, a plurality of stoppers 74 (two in the example of the drawing) are arranged at a predetermined pitch in the height direction. In the second introduction unit 7 of the present embodiment, when the transfer case 72 is raised to a certain extent from the lower position to the upper position, the state of contact between the lowermost stopper 74 and the subsequent test piece storage container B is canceled, and when the transfer case 72 has been moved to the upper position, a subsequent test piece storage container B moving by its own weight toward the transfer case 72 can be accommodated in the transfer case 72 at the upper position. The second introduction unit 7 is provided with a sensor (upper position detection sensor 76) for detecting the transfer case 72 in the upper position and a sensor (lower position detection sensor 77) for detecting the transfer case 72 in the lower position at appropriate locations (refer to FIG. 10).

In the continuous processing apparatus X of the present embodiment, the secondary introduction line L7 (see FIG. 10), which is the introduction line of the test piece storage container B by the secondary introduction unit 7, is set at a steeper gradient than the primary introduction line L6. Then, the test piece storage container B that has moved while sliding by its own weight along the primary introduction line L6 from the front side to the back side of the measuring apparatus Y is further moved along the secondary introduction line L7 to the starting end of the main transfer line L4 while an inclined posture suitable for the test piece take-out process is maintained by the mechanical mechanism (elevator mechanism 71).

The introduction unit 5 of the present embodiment is configured by such a combination of the primary introduction unit 6 and the secondary introduction part 7. Note that the primary introduction unit 6 has a configuration not particularly equipped with a mechanical mechanism. In the introduction unit 5, the primary introduction unit 6 can bridge a plurality (up to seven in the present embodiment) of test piece storage containers B in a state of being aligned on the primary introduction line L6, and the secondary introduction unit 7 descends and moves the test piece storage container B one by one along the secondary introduction line L7. Particularly, the secondary introduction unit 7 is configured by a mechanism to stop or suppress unnecessary impact on the test piece storage container B during the descent movement and the descending movement completion of the test piece storage container B along the secondary introduction line L7 set to a steeper gradient than the primary introduction line L6.

In the test piece storage container continuous processing apparatus X of the present embodiment, a sensor for detecting the presence or absence of the test piece storage container B is provided at a predetermined position of the introduction unit 5. The present embodiment is provided a sensor (introduction unit empty sensor 51) capable of detecting the test piece storage container B accommodated in the transfer case 72 set at the upper position in the second introduction unit 7 (refer to FIG. 8). Note that in FIGS. 8 and 10, the leading end portion of the stopper 74 when the transfer case 72 is at the upper position, that is, the position of the support roller 75, is indicated by the symbol "75 (t)", and the position of the leading end portion of the stopper 74 when the transfer case 72 is at the lower position, that is, the position of the support roller 75, is indicated by the symbol "75 (u)".

Figure 11:
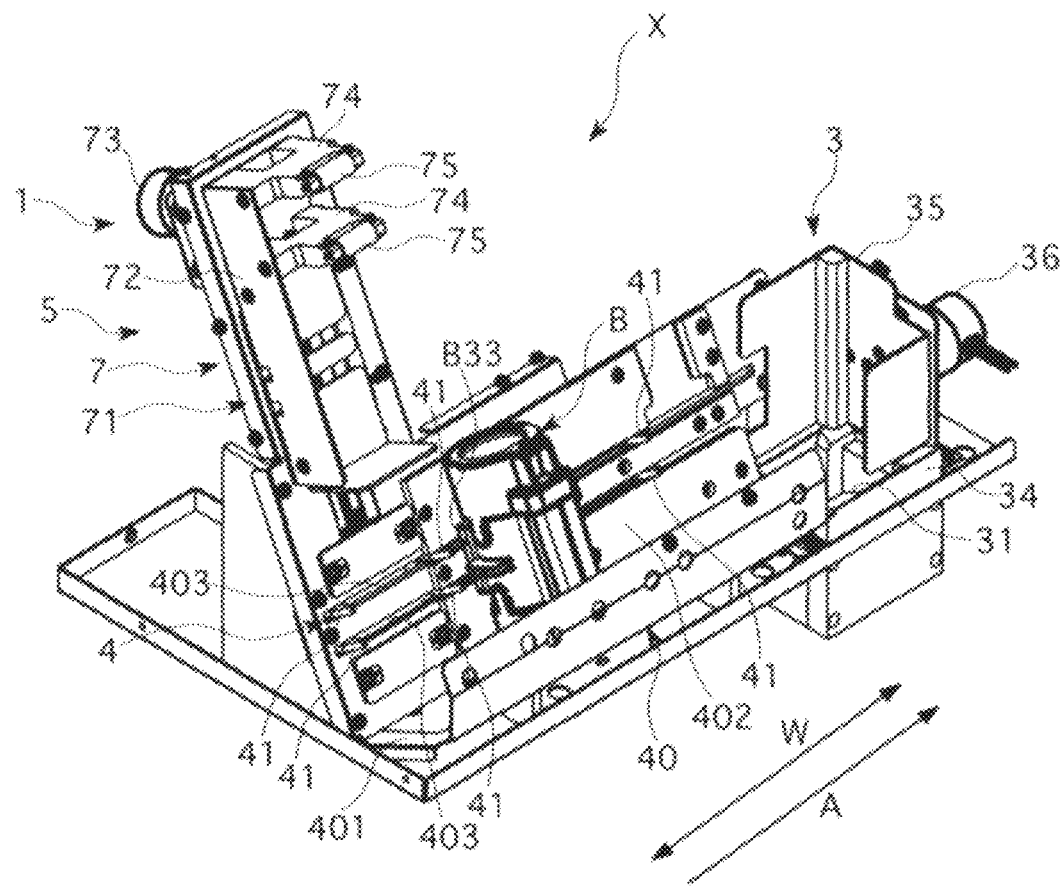
FIG. 11 is a perspective view partially omitting the main transfer unit of the embodiment.
Figure 12:
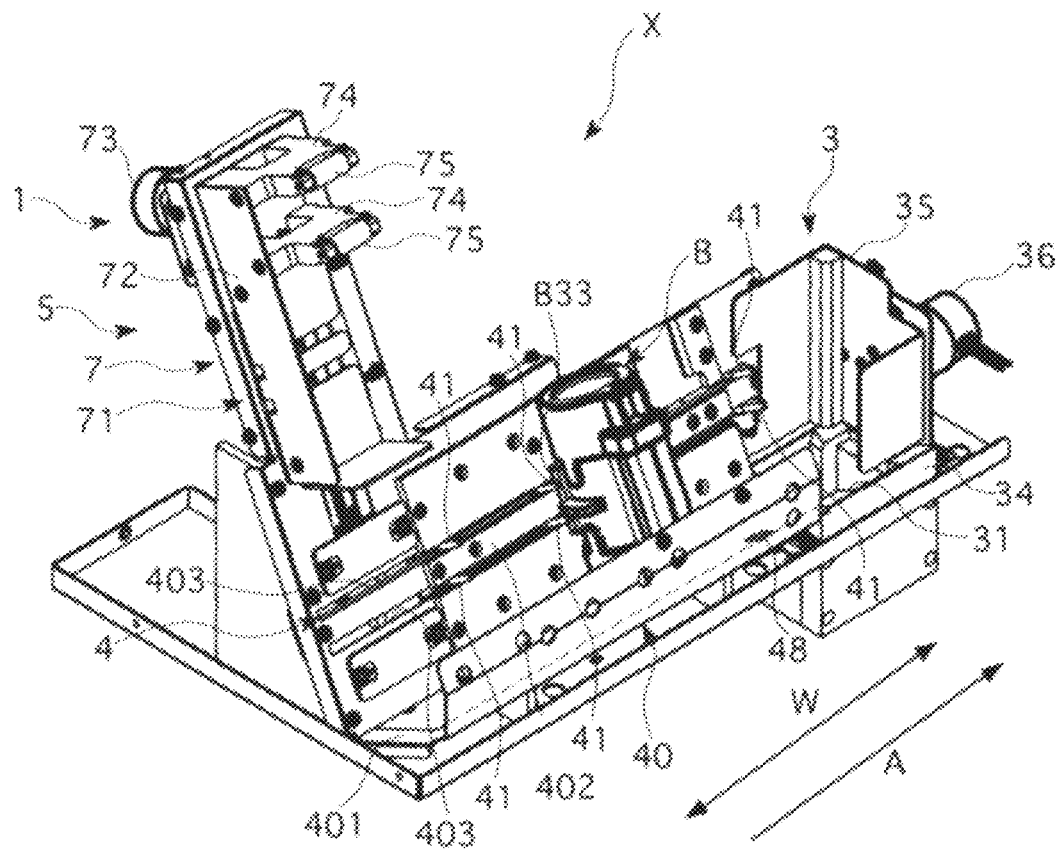
FIG. 12 is a view showing the main transfer unit at the time of completion of the feeding operation in correspondence with FIG. 11.

As shown in FIGS. 11 to 14, the main transfer unit 4 transports the test piece storage container B that has reached the beginning of the main transfer line L4 to at least the test piece take-out position. FIG. 11 and FIG. 12 are perspective views seen from the same direction as FIG. 7, and the primary introduction unit 6 is omitted.

The main transfer unit 4 includes a lever 41 that can press the test piece storage container B on the main base 40 extending along the width direction W of the measuring apparatus Y toward the terminal end of the main transfer line L4. Here, the main base 40 can support the test piece storage container B in a predetermined inclined posture suitable for the test piece take-out process. A base having a shape conforming to that of the main base 40 is provided within the housing Y1 of the measuring apparatus Y as part of a mechanism for transferring the test piece storage container even in a conventional measuring apparatus Y to which the continuous processing apparatus X according to the present embodiment is not applied. In the present embodiment, the main transfer unit 4 is configured using as the main base 40 a partially improved version of a conventional base. The main base 40 has at least a main base body 401 that supports the bottom surface of the test piece storage container B, and a support wall 402 that supports the test piece storage container B that rests in an inclined posture.

The lever 41 reciprocates in the extending direction of the main base 40, and can maintain the state projecting forward from the support wall 402 and press and move the test piece storage container B in the transfer direction A when moving in a direction (positive direction, see FIG. 13) that coincides with the transfer direction A of the test piece storage container B along the transfer line L4; the lever 41 is set in a state (not shown) in which it is rotated to retract to the back side of the support wall 402 by striking the test piece storage container B and not to push back the test piece storage container B when moving in the opposite direction (reverse direction) to the transfer direction A of the test piece storage container B. Hereinafter, the operation of moving the lever 41 to the downstream side (forward direction) of the main transfer line L4 in the transfer direction A is referred to as a "feeding operation", and the operation of moving the lever 41 upstream (reverse direction) of the main transfer line L4 in the transfer direction A is referred to as a "return operation". A lever movement opening 403 for permitting reciprocation of the lever 41 is formed in the support wall 402 (see FIGS. 11 and 12).

Figure 13:
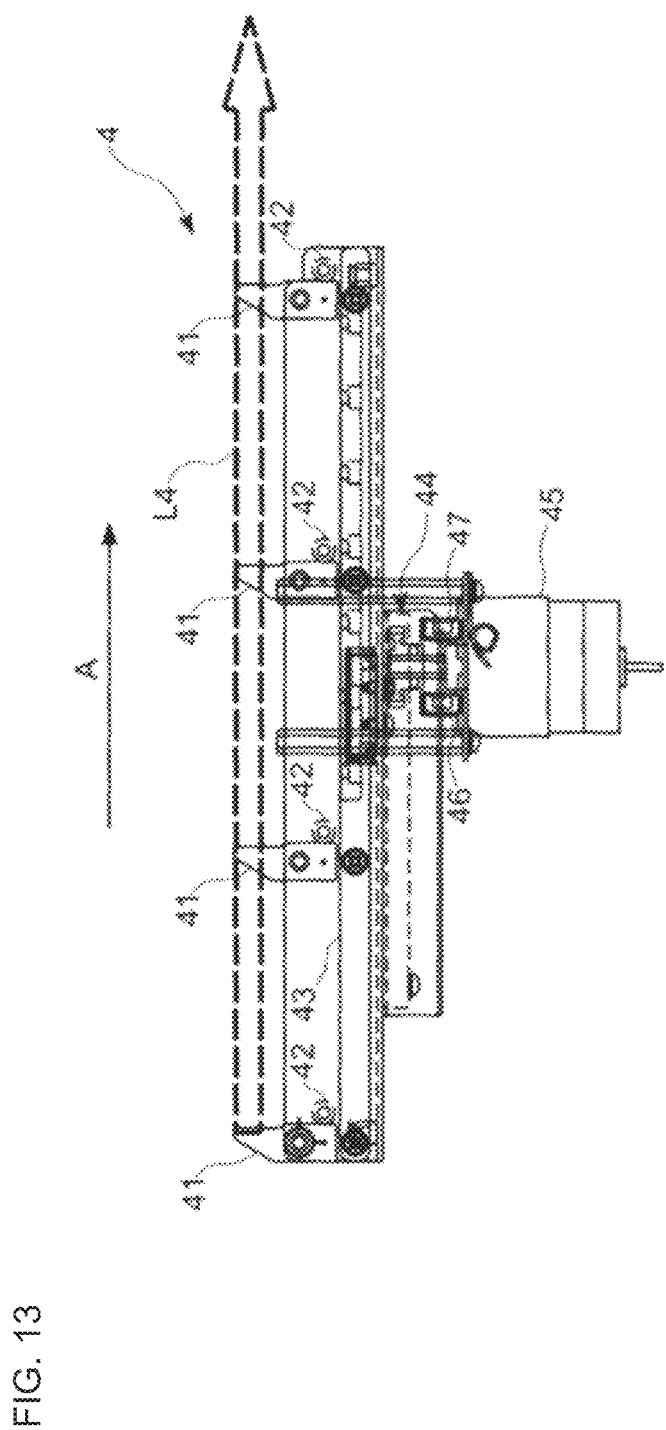
FIG. 13 is a plan view partially omitting the main transfer unit of the embodiment.
Figure 14:
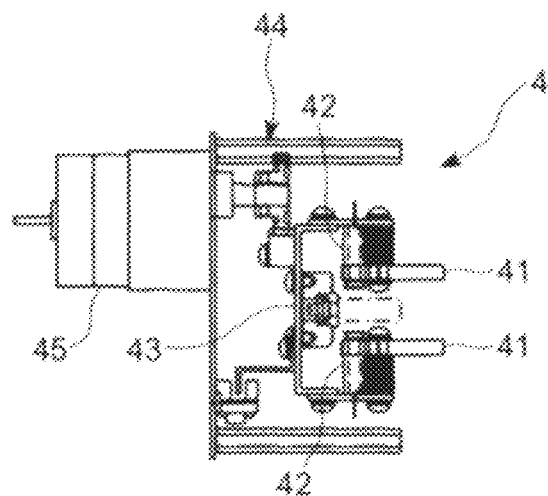
FIG. 14 is a side view partially omitting the main transfer unit of the embodiment.

A lever 41 is provided a stopper pin 42 to regulate the rotation in one direction (positive direction) of the lever 41 in a posture in which the protruding end region of the lever 41 protrudes forward beyond the support wall part 402 is provided in the vicinity of the base end part positioned deeper than the support wall part 402 during the feeding operation, and permit the rotation of the lever 41 in the other direction (reverse direction) (see FIGS. 13 and 14). In this way, the lever 41 can be maintained in a posture in which the protruding end part protrudes forward from the support wall 402 and is exposed during the feeding operation, and the lever 41 can attain a posture in which the lever 41 is retracted deeper than the support wall 402 so that the entire lever 41 does not protrude forward from the support wall part 402 when the protruding end part of the lever 41 abuts the test piece storage container during the return operation.

At the time of the feeding operation (pushing action), the main transfer unit 4 of the present embodiment presses the test piece storage container B simultaneously from the two different positions in the height direction in order not to tilt the container B, and at this time the lever 41 is arranged in two stages upper and lower so as not to incline the test piece storage container B. A plurality of levers 41 are arranged at a predetermined pitch along the transfer direction A of the main transfer line L4. In the present embodiment, four groups of upper and lower stage levers 41 are arranged at a predetermined pitch in the transfer direction A of the main transfer line L4 (see FIG. 13). All the levers 41 and the stopper pins 42 are attached to a common lever support bracket 43, and by reciprocating the lever support bracket 43, it is possible to perform feeding and return operations of all the levers 41 at once (see FIGS. 13 and 14). Then, the main transfer unit 4 of the present embodiment repeat the feeding operation and return operation of each lever 41 by causing the lever support bracket 43 to repeatedly reciprocate a distance identical to 1 pitch or a distance longer than 1 pitch, that is, the separation distance or longer between levers 41, along the transfer direction A of the test piece storage container B. Note that in the present embodiment the test piece storage container B is provided with a pressed part B33 that is pressed by the lever 41. The reciprocating movement of the lever support bracket 43 is realized by using a rack and pinion mechanism 44 and a motor (main transfer motor 45) for driving the rack and pinion mechanism 44 (see FIGS. 13 and 14). In the present embodiment, a stepping motor is used as the main transfer motor 45.

The main transfer unit 4 includes a sensor (feed operation start position sensor 46) for detecting the presence or absence of the lever 41 at the start position of the feeding operation, and sensor (return operation start position sensor) for detecting the presence or absence of the lever 41 at the start position of the return operation And a start position detection sensor 47) which are disposed at appropriate positions (see FIG. 13). The return operation start position of the lever 41 is the same as the feed operation end position, and the feed operation start position is the same as the return operation end position.

When each lever 41 is positioned at the feed operation start position, the lever 41 disposed at the position closest to the start end of the main transfer line L4 among the plurality of levers 41 is held by the transfer case 72 positioned at the lower position and comes into contact with or in proximity to the test piece storage container B that is maintained by the transfer case 72 disposed at the lower position. In this state, when the feeding operation of the lever 41 is started, the test piece storage container B accommodated in the transfer case 72 positioned at the lower position is moved in the forward direction by 1 stroke, that is, the moving distance of the previously set lever 41 in one feeding operation, to the downstream side in the transfer direction A (a direction approaching the test piece take-out position) and leaves the transfer case 72. In the present embodiment, the movement distance of one stroke of the lever 41 is set to the same distance as the separation distance between the levers 41 along the transfer direction A, or a distance slightly longer than the separation distance between the levers 41.

It is possible to sequentially move the test piece storage container B to the downstream side in the conveying direction A by performing the return operation after the feeding operation of each lever 41 and again performing the feed operation of the lever 41. In the present embodiment, the feeding operation and the return operation of the respective levers 41 are alternately repeated twice with respect to the test piece storage container B that has reached the beginning end of the main transfer line L4, and the test piece storage container B can be moved to the take-out position at the time when the feeding operation of each lever 41 is completed a third time. FIG. 12 shows the position of the test piece storage container B at the end of the feeding operation of the second lever 41. In the present embodiment, the test piece storage container B can be moved to the test piece take-out position by repeating the feeding operation and return operation of the lever 41 three times. In the continuous processing apparatus X of the present embodiment, a sensor (container take-out position sensor 48) for detecting the presence or absence of the test piece storage container B at the test piece take-out position is provided at a predetermined location of the main transfer unit 4. As schematically shown in FIG. 12, the container take-out position sensor 48 is provided, for example, on a bottom surface of the main base 40 (downward surface of the base main body 401) at a position where the arrival of the test piece storage container B at the take-out position can be detected.

In the present embodiment, a test piece storage container B that is in contact with the lever 41 disposed closest to the terminal end of the main transfer line L4 among the plurality of levers 41 and wherein each lever 41 is positioned at the feeding operation end position, has reached the discharge preparation position set further downstream in the transport direction A than the test piece take-out position. That is, in the present embodiment, the main transfer unit 4 transports the test piece storage container B to the discharge preparation position set farther downstream side in the transport direction A than the test piece take-out position. Note that the closed state of the opening and closing lid B2 is maintained until the lid opening process by the lid opening unit 2, which will be described later, is performed after the test piece storage container B introduced from the introduction starting end 11 reaches the test piece takeout position.

As shown in FIGS. 15 to 18, the lid opening unit 2 switches the opening and closing lid B2 from the closed state to the open state at the test piece take-out position. The lid opening unit 2 includes a swing lever 21 that pushes the protrusion B25 of the opening and closing lid B2 in a closed state from above, and a motor (lid opening/closing motor 22) that swings the swing lever 21 around the swing lever axis. In the present embodiment, a stepping motor is used as the lid opening/closing motor 22.

Figure 15:
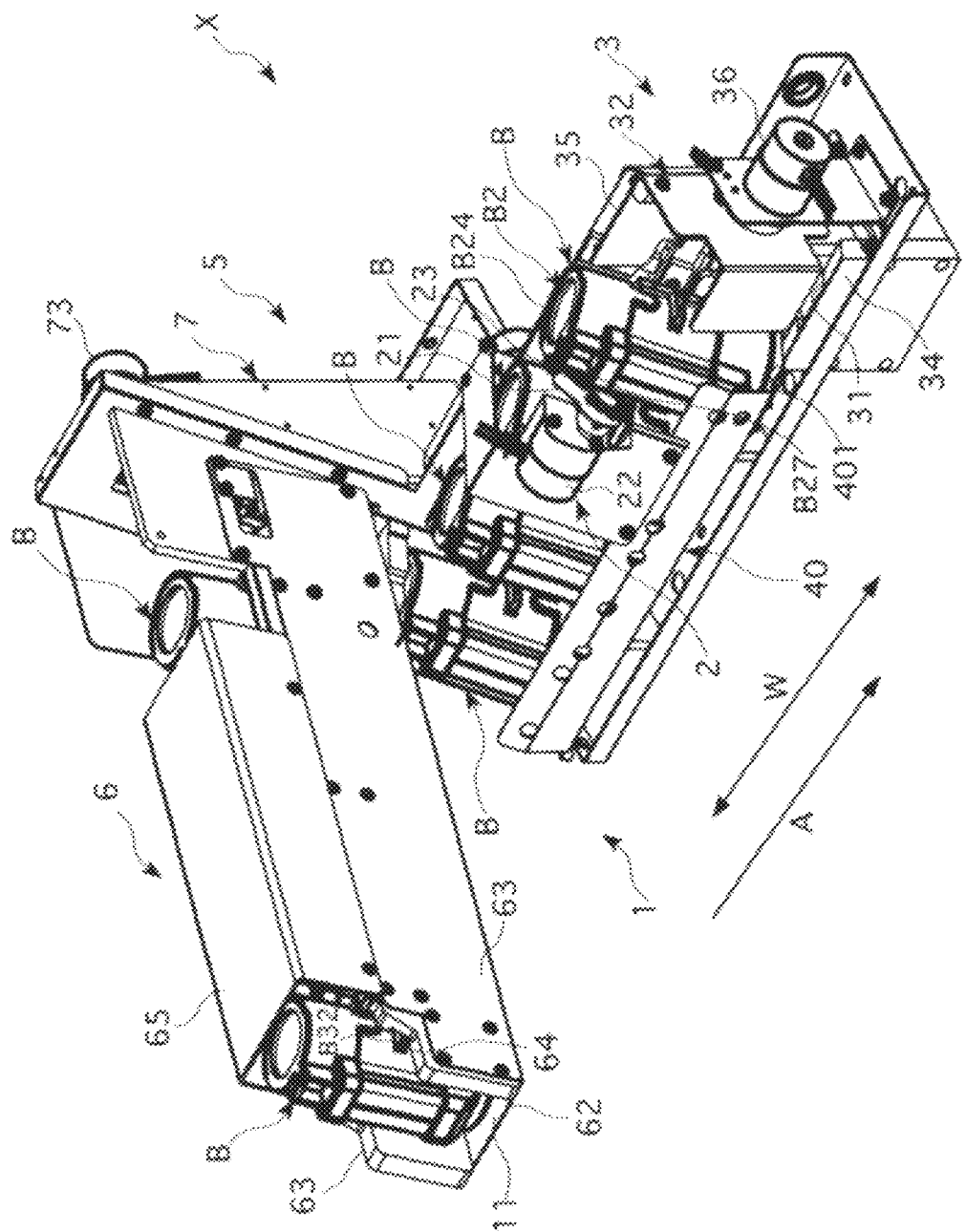
FIG. 15 is a perspective view showing the lid opening unit of the same embodiment.
Figure 17:
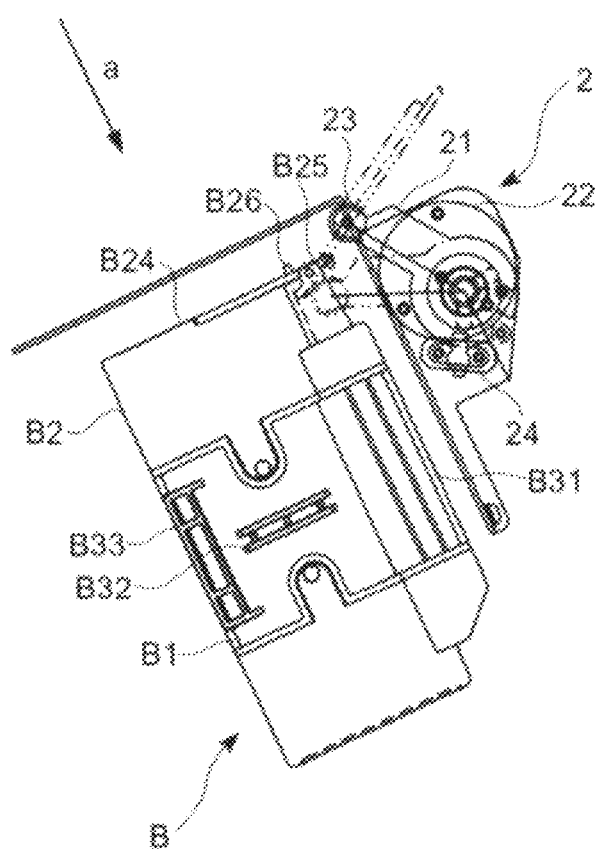
FIG. 17 is a side view of the lid opening unit of the same embodiment.
Figure 18:
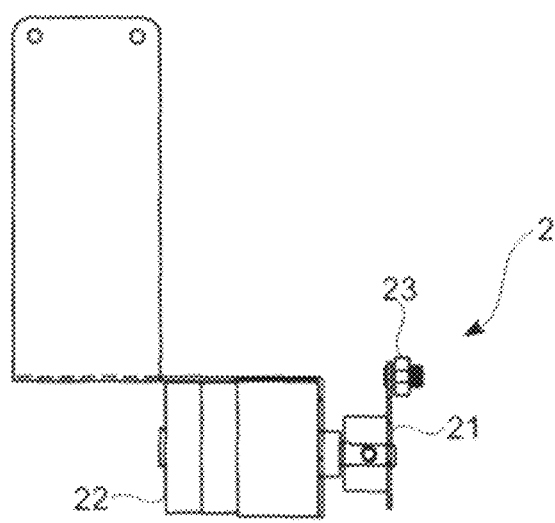
FIG. 18 is a view as seen in the direction of arrow a in FIG. 17.

By swinging the swing lever 21 from the pre-swing-down preparation position to the swing-down position, the tip end part of the swing lever 21 pushes the protrusion B25 of the lid main body B24 to rotate the lid main body B24 around the hinge shaft B23 so that the opening and closing lid B2 can be switched from the closed state to the open state. In the present embodiment, a bearing 23 is provided at the tip part of the swing lever 21, and the bearing 23 rolls while contacting the protrusion B25 of the lid main body B24. FIG. 15 shows a state in which the swing lever 21 is swung down and positioned at the pre-swing-down preparation position to maintain the opening and closing lid B2 in the closed state, and FIG. 16 shows the swing lever 21 swung down from the pre-swing-down preparation position and the opening and closing lid B2 is switched from the closed state to the open state. In FIG. 17, the opening and closing lid B2 in the closed state and the swing lever 21 in the pre-swing-down preparation position are indicated by solid lines, and the opening and closing lid B2 in the open state and the swing lever 21 in the swing down position are indicated by two-dot chain lines. FIG. 17 is a view looking in the direction of arrow a, and FIG. 18 shows the test piece storage container B omitted.

When the swing lever 21 has moved from the pre-swing-down preparation position to the swing-down position, the lid opening unit 2 of the embodiment can prevent and suppress unnecessary behaviors such as swinging of the entire test piece storage container B during the test piece take-out process by fitting the bearing 23 into the bearing receiving part B27 (see FIG. 3) formed just under the hinge shaft B23 of the opening and closing lid B2. In the present embodiment, a sensor (pre-swing-down preparation position sensor 24) for detecting whether the swing lever 21 is in the pre-swing-down preparation position is provided at an appropriate position of the lid opening unit 2 (see FIG. 17).

In the present embodiment, the opening and closing lid B2 can be switched from the open state to the closed state by swinging the swing lever 21 from the swing down position to the pre-swing-down preparation position. That is, the lid opening unit 2 functions as a lid opening and closing unit that can freely switch between the open state and the closed state of the opening and closing lid B2. Therefore, after the test piece take-out process is completed, the opening and closing lid B2 is switched from the open state to the closed state by swinging the swing lever 21 from the swing down position to the pre-swing-down preparation position. Note that at the time when the swing lever 21 starts swinging back from the swing-down position toward the pre-swing-down preparation position, the opening and closing lid B2 is pressed in the direction of rotation around the hinge shaft B23 so as to return to the closed state by the tip end (bearing 23) of the swing lever 21 abutting the convex part for closing return B26 (see FIGS. 3 and 17) provided on a part of the opening and closing lid B2, and the swing lever 21 swings back toward the pre-swing-down preparation position. In the present embodiment, when the opening and closing lid B2 is switched from the open state to the closed state, the opening and closing lid B2 is rotated about the hinge shaft B23 and the opening and closing lid B2 rotates by its own weight to the closed state since the test piece storage container B is maintained in the predetermined inclined posture at the test piece take-out position.

In the present embodiment, the test piece storage container B transferred from the test piece take-out position to the discharge preparation position by the main transfer unit 4 is configured to be able to be discharge from the discharge port 31 by the discharge unit 3. As shown in FIGS. 4 and 19 to 25, a posture changing unit 32 for changing the test piece storage container B from an inclined posture suitable for the test piece take-out process to a vertical posture is provided at the discharge preparation position set on the downstream side of the main transfer line L4 relative to the test piece take-out position, and causes the test piece storage container B in the vertical posture to fall from the discharge port 31 into the collection region 33.

Figure 25:
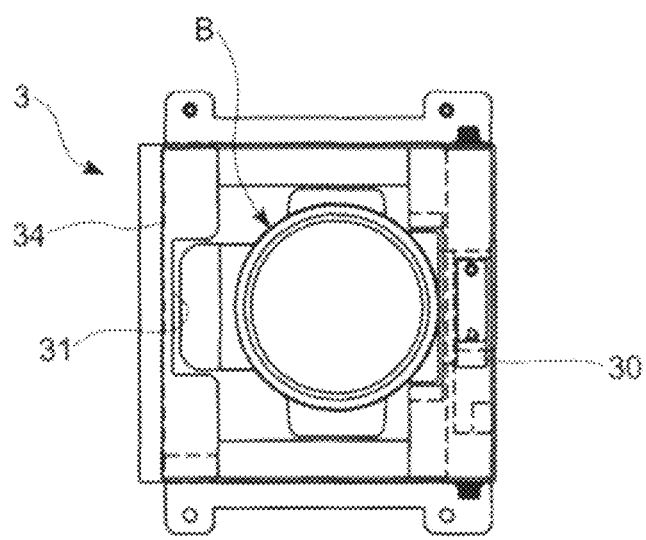
FIG. 25 is a plan view partially showing the discharge unit of the same embodiment.

The discharge port 31 is an opening penetrating in the height direction formed in the inclined posture holding base 34 which is capable of holding the test piece storage container B in the inclined position at the discharge preparation position, and the opening direction is set in the vertical direction. As shown in FIG. 25, the shape of the opening of the discharge port 31 is a shape that allows the test piece storage container B in a vertical posture to pass therethrough, and is a shape that does not allow the test piece storage container B that is not in the vertical posture to pass through. In FIG. 25, the posture changing unit 32 is omitted.

Figure 19:
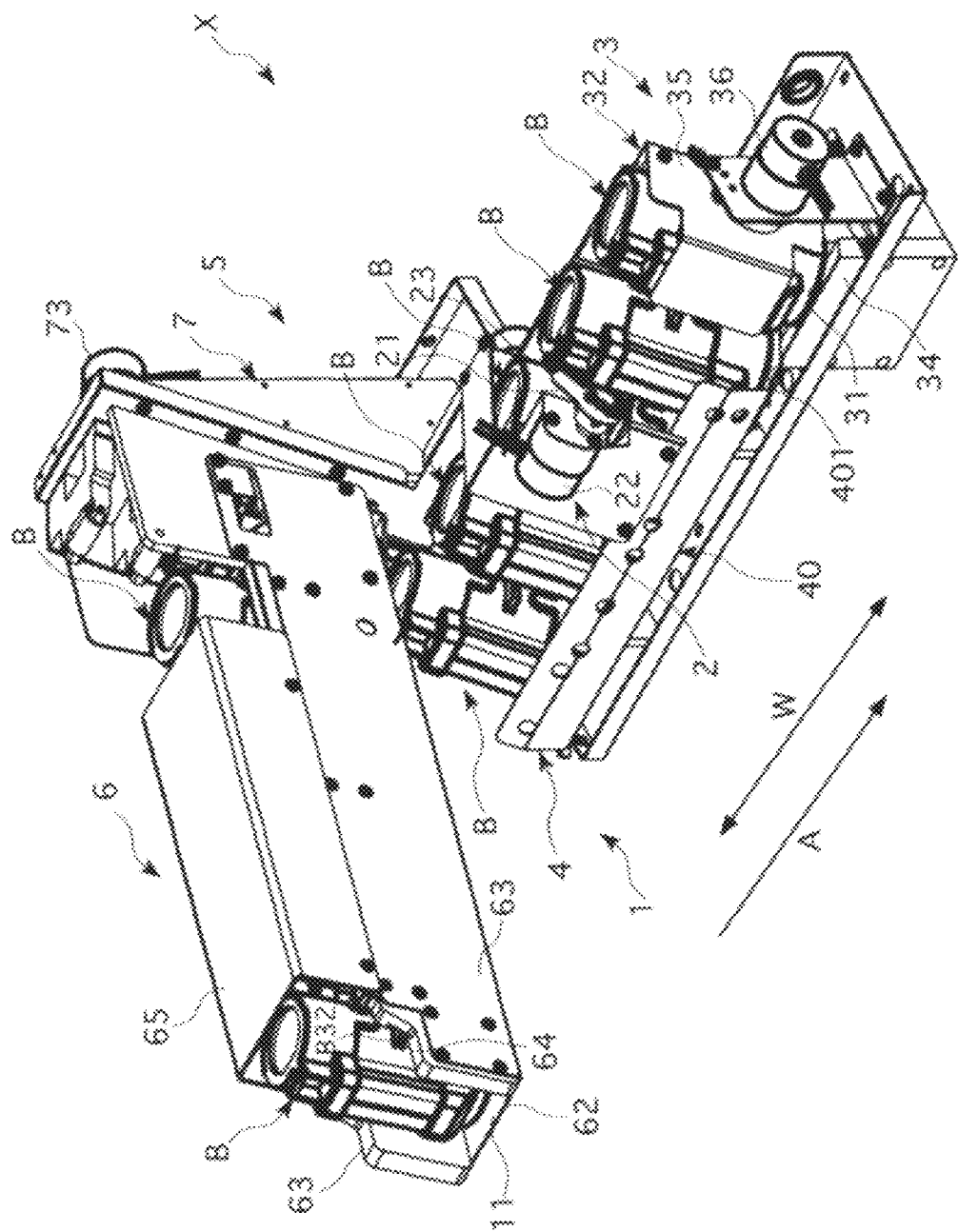
FIG. 19 is a view corresponding to FIG. 4 showing the state immediately before the discharge operation is started.
Figure 20:
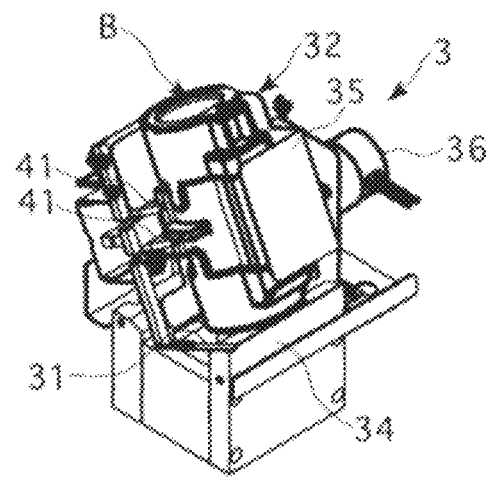
FIG. 20 is a perspective view partially showing the discharge unit immediately before the discharge operation is started.
Figure 21:
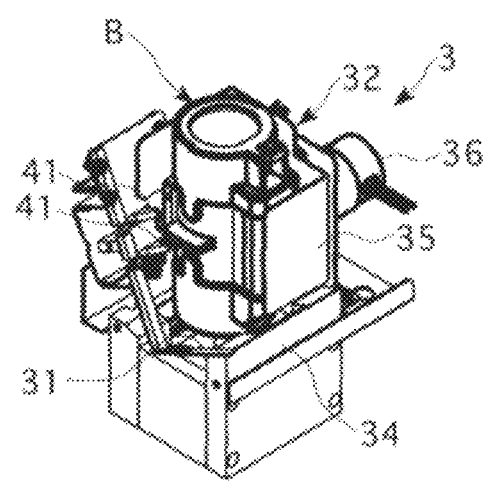
FIG. 21 is a view corresponding to FIG. 20 showing the discharge unit immediately after the discharge operation is started.

The posture changing unit 32 is provided with a holding case 35 that holds the test piece storage container B that has reached the discharge preparation position from the test piece takeout position, and a motor (discharge motor 36) that rotates and moves the holding case 35 between a pre-discharge receiving position for holding the test piece storage container B in the inclined posture at the discharge preparation position and a vertical posture correction position for correcting the test piece storage container B from the inclined posture to a vertical posture. In the present embodiment, a stepping motor is used as the discharge motor 36. FIGS. 4 and 20 show the holding case 35 at the discharge pre-discharge receiving position, and FIGS. 19 and 21 show the holding case 35 at the vertical posture correction position. FIG. 20 and FIG. 21 are perspective views of the discharge unit 3 as seen from the same direction as FIG. 11.

Figure 24:
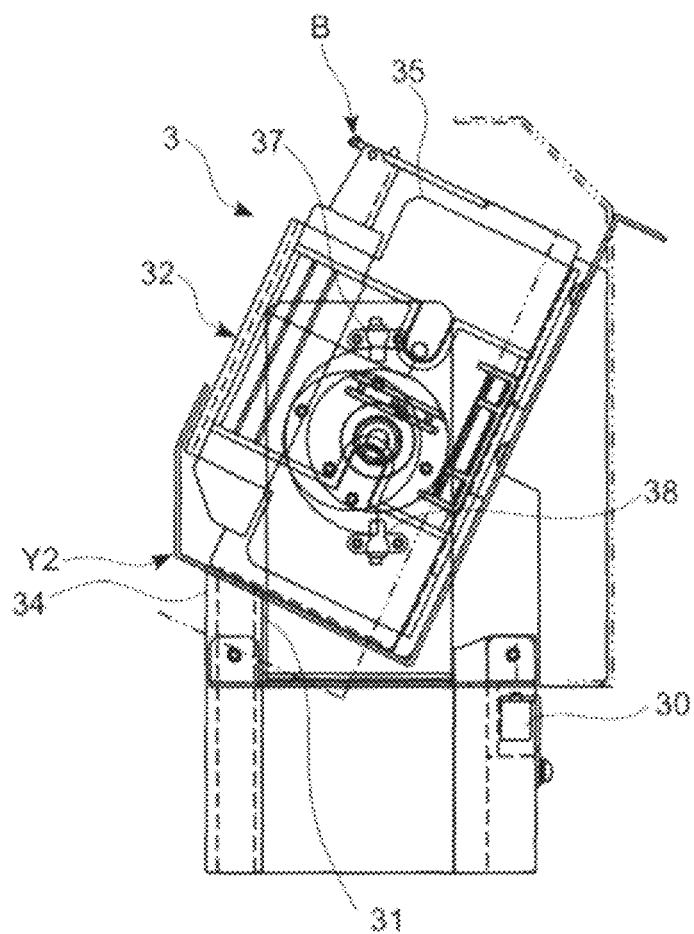
FIG. 24 is a side view of the discharge unit of the embodiment.

The discharge unit 3 includes a sensor (a pre-discharge receiving position sensor 37) for detecting the holding case 35 located at the pre-discharge receiving position, and a sensor (a vertical posture correction position sensor 38) for detecting the holding case 35 at the vertical posture correction position) provided at appropriate locations (see FIG. 24). The discharge unit 3 of the present embodiment is set so as to rotate the holding case 35 by a predetermined angle (for example, 15 degrees to 25 degrees) between the pre-discharge receiving position and the vertical posture correction position. When the holding case 35 is rotated to the vertical posture correction position while holding the test piece storage container B at the pre-discharge position, the test piece storage container B is converted from the inclined posture to the vertical posture and falls downward from the discharge port 31 in the vertical posture.

Figure 22:
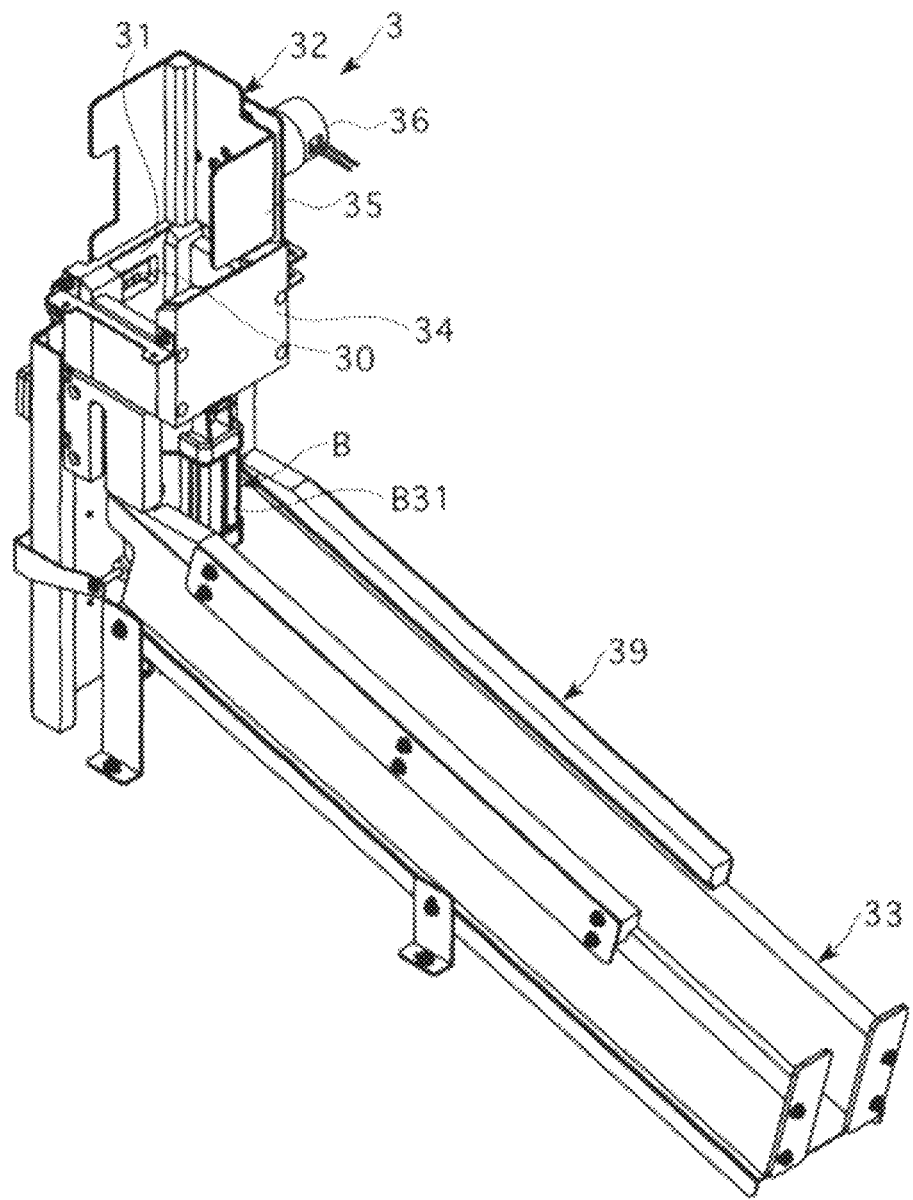
FIG. 22 is a view showing a collection state of the test piece storage container discharged from the discharge port of the discharge unit of the embodiment.
Figure 23:
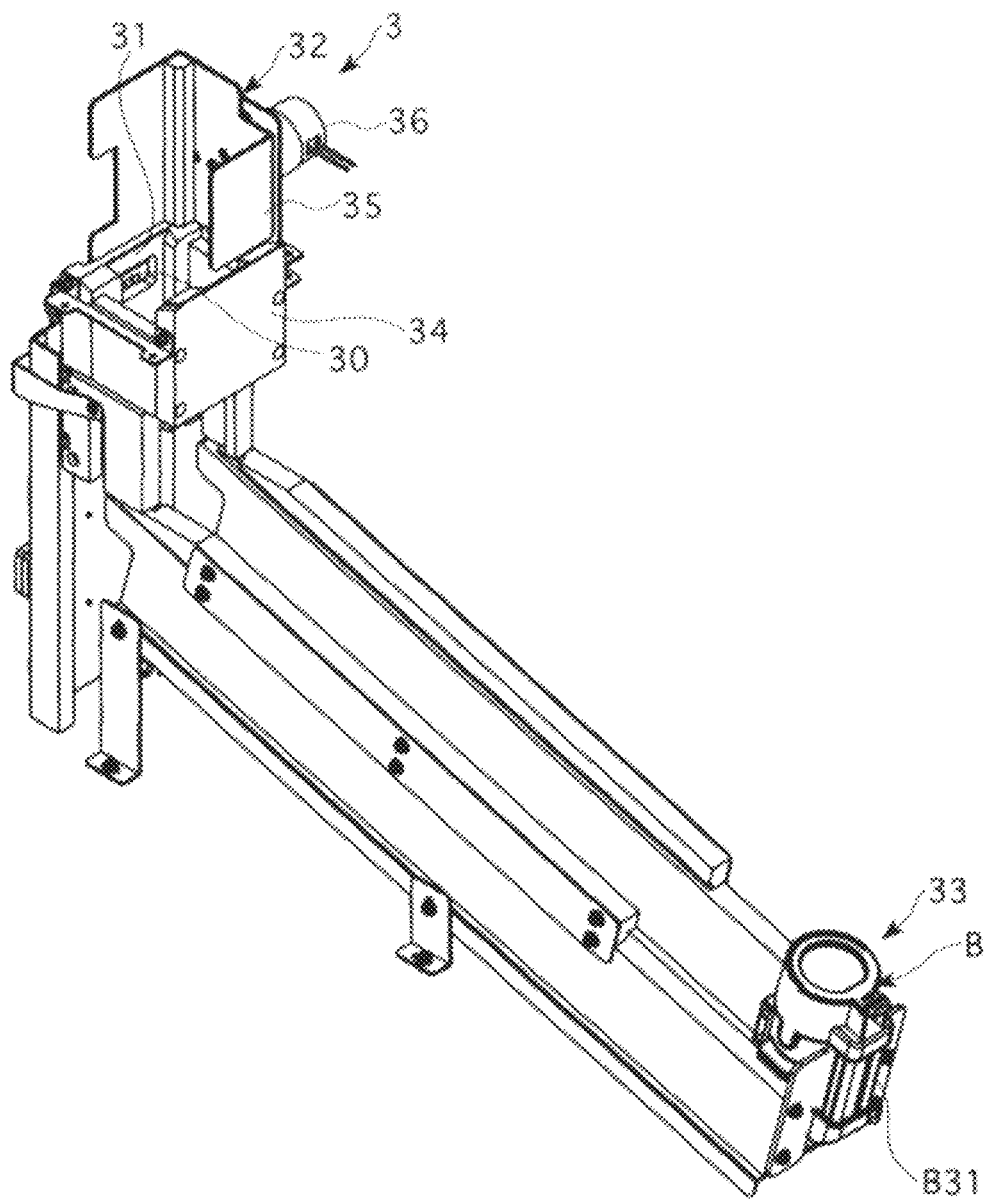
FIG. 23 is a view corresponding to FIG. 22 showing a state in which the test piece storage container is collected in the collection area.

The discharge unit 3 of the present embodiment moves the test piece storage container B dropped downward from the discharge port 31 by its own weight along the discharge passage 39 shown in FIGS. 22 and 23, for example, to a predetermined collection area 33. The discharge passage 39 and the collection area 33 can be disposed in the internal space of a mounting table Y2 (see FIGS. 1 and 2) that supports the housing Y1 of the measuring apparatus Y. Accordingly, the test piece storage container B that has reached the discharge preparation position along the main transfer line L4 of the main transfer unit 4 is collected in the collection area 33 which is set at a position lower than the main transfer line L4.

It is possible to remove the test piece storage container B collected in the collection area 33 from the collection area 33 Although the maximum collection number of the test piece storage containers B discharged from the discharge port 31 is determined by the size of the collection area 33 itself and the length from the discharge port 31 to the collection area 3 and the like, the test piece storage containers B collected in the collection area 33 can be removed from the collection area 33 if the configuration is such that the operator can access the collection area 33. As shown in FIG. 23, the desiccant storage part B31 of the test piece storage container 3 that has reached the collection region 33 can be fitted into the notch formed in the collection area 33.

Note that if the discharge path 39 and collection area 33 shown in FIG. 22 are not adopted, a box-shaped collection case that can accommodate numerous test piece storage containers B dropped downward from the discharge port 31, for example, also can be disposed below the discharge port 31. The discharge unit 3 of the present embodiment has a sensor (a collection area full capacity sensor 30) for detecting whether a test piece storage containers B is present at a position lower than the upper opening edge of the discharge port 31 (see FIGS. 22 to 24).

Among the primary introduction unit 6, the secondary introduction unit 7, the main transfer unit 4, the lid opening unit 2, and the discharge unit 3 described above, in the present embodiment, the secondary introduction unit 7, the main transfer unit 4, the secondary introduction unit 7, the main transfer unit 4, the lid opening unit 2, and the discharge unit 3 are configured by mechanical mechanisms, respectively. The bottle continuous processing apparatus X according to the present embodiment provided with such parts and mechanisms can move the test piece storage container B introduced from the introduction starting end 11 of the introduction unit 5 in one direction along the primary introduction line L6, the secondary introduction line L7, and main transfer line L4 to be collected in the collection area 33 of the discharge unit 3. In the continuous processing apparatus X of the present embodiment, it is possible for an operator to successively introduce the test piece storage containers B introduced from the introduction starting end 11 into the housing Y1 of the measuring apparatus Y, and a maximum of 10 test piece storage containers B can be installed from the test piece take-out position to the introduction starting end 11. The test piece storage container B on which the test piece take-out process has been completed at the test piece take-out position can be moved from the main transfer line L4 to the collection area 33 by the discharge unit 3. Accordingly, the operator can sequentially replenish the test piece storage containers B from the introduction starting end 11 if the test piece storage container B in the collection area 33 is appropriately collected so that the collection area 33 is not filled.

The processing procedure and the operational effect when the continuous processing apparatus X of the test piece storage container large capacity installation model having such a configuration is applied to the measuring apparatus Y is described below.

Figure 26:
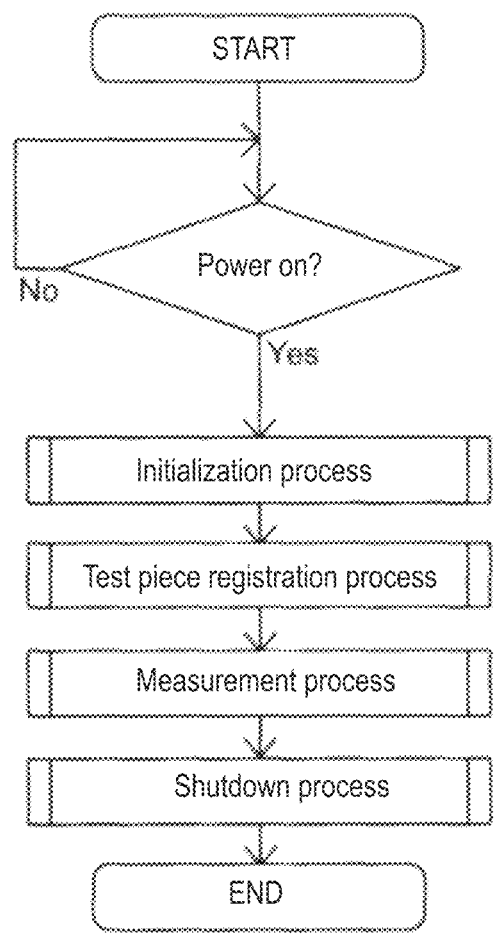
FIG. 26 is a flowchart of the overall processing by the measuring apparatus of the embodiment.

As shown in FIG. 26, when the measuring apparatus Y of the present embodiment is turned on, each mechanism of the continuous processing apparatus X (secondary introduction unit 7, main transfer unit 4, lid opening unit 2, discharge unit 3) is initialized. More specifically, the transfer case 72 of the secondary introduction unit 7 is set at the upper position, the swing lever 21 of the lid opening unit 2 is set to the pre-swing-down preparation position, the lever 41 of the main transfer unit 4 is set at the feeding operation start position, and the holding case 35 of the discharge unit 3 is set at the pre-discharge receiving position. Such an initialization process is carried out based on the detection information of the sensors (upper position detection sensor 76, lower position detection sensor 77, pre-swing-down preparation position sensor 24, feeding operation start position sensor 46, return operation start position sensor 47, pre-discharge receiving position sensor 37, and the vertical posture correction position sensor 38).

Figure 27:
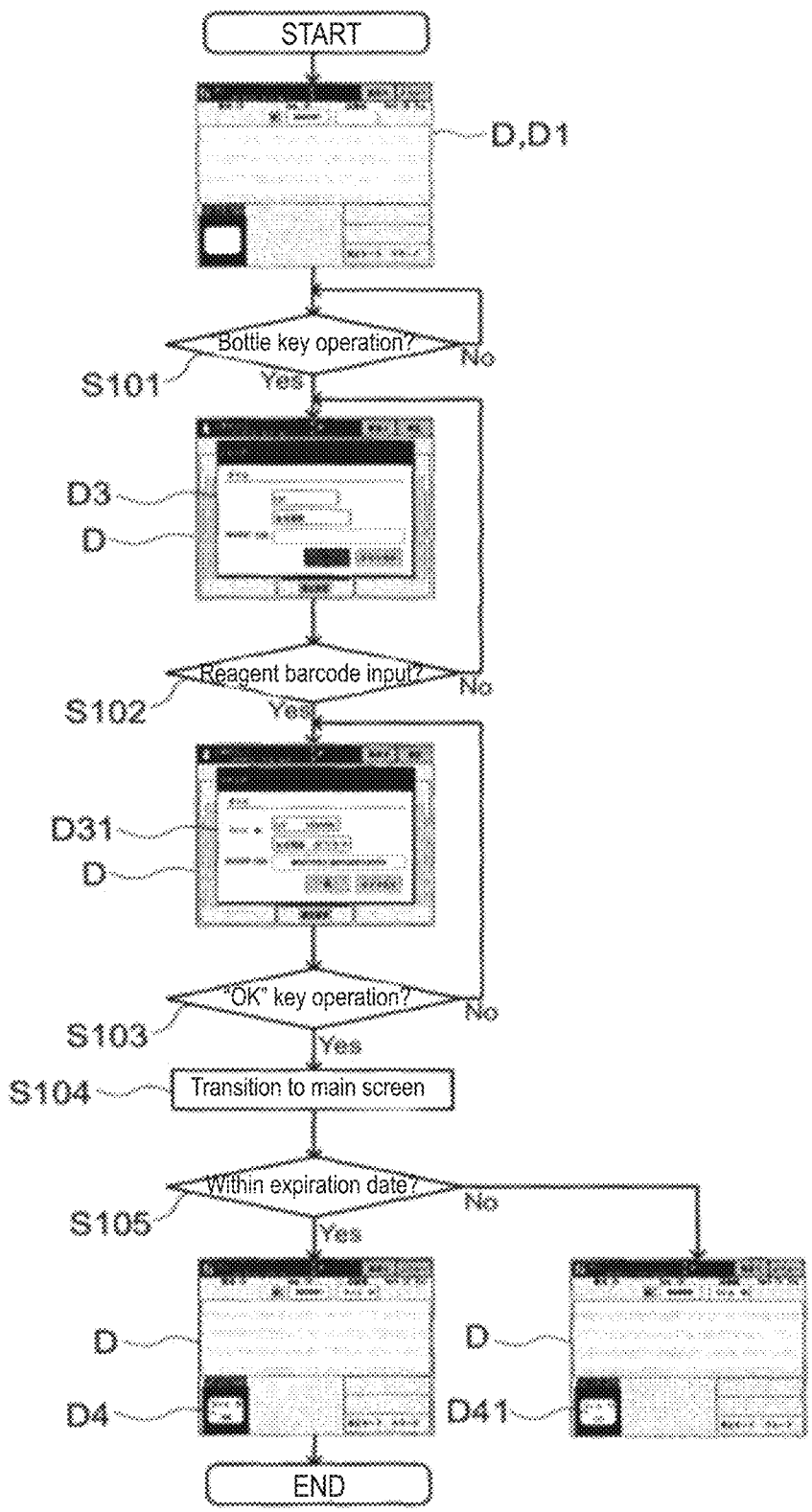
FIG. 27 is a flowchart of a test piece registration process according to the embodiment.

As shown in FIG. 26, the measuring apparatus Y of the present embodiment performs a test piece registration process following initialization processing of each mechanism (second introduction unit 7, main transfer unit 4, the lid opening unit 2, discharge unit 3). FIG. 27 is a flowchart of the test piece registration process.

Figure 28A:
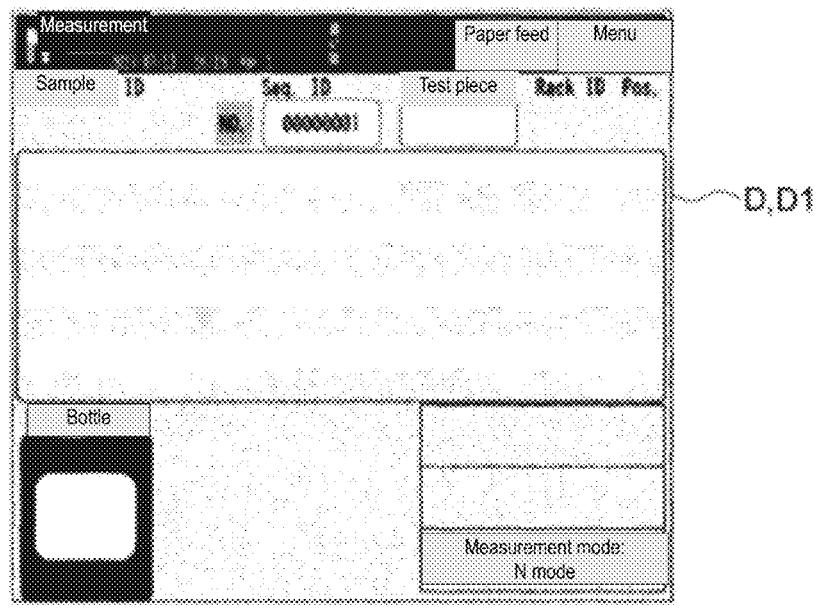
FIGS. 28A and 28B are diagrams showing an example of a display screen according to the embodiment.
Figure 28B:
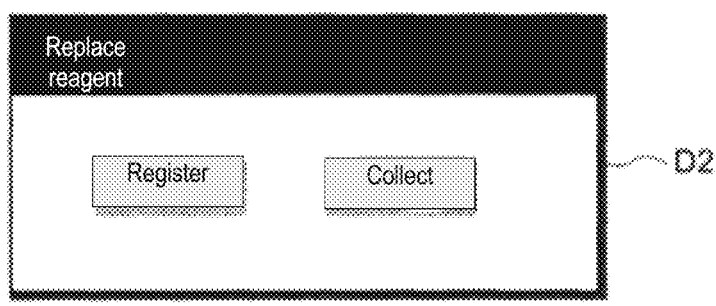

The measuring apparatus Y of the present embodiment is provided with display D at an appropriate location (in the illustrated example, the front face of the housing Y1), and, in regard to the test piece registration process, the measuring apparatus Y detects the presence or absence of the operation of pressing of the "bottle" key displayed on the main screen D1 (see FIG. 28A of the display D by the operator ("bottle" key operation detected/not detected step S101, see FIG. 27). When detecting the operation of the "bottle" key by the operator, a pop-up (pop-up D2 of reagent replacement) of whether to register or collect the test piece storage container B is displayed on the display D (see display example of reagent replacement pop-up D2 shown in FIG. B). Note that during the measurement process to be described later, not to accept the operation of the "bottle" key on the main screen D1 may be set. Note that the screen display content and the pop-up display example of the display D including the above-mentioned "bottle" are mere examples, and other languages or other expressions and descriptions may be used.

Figure 29C:
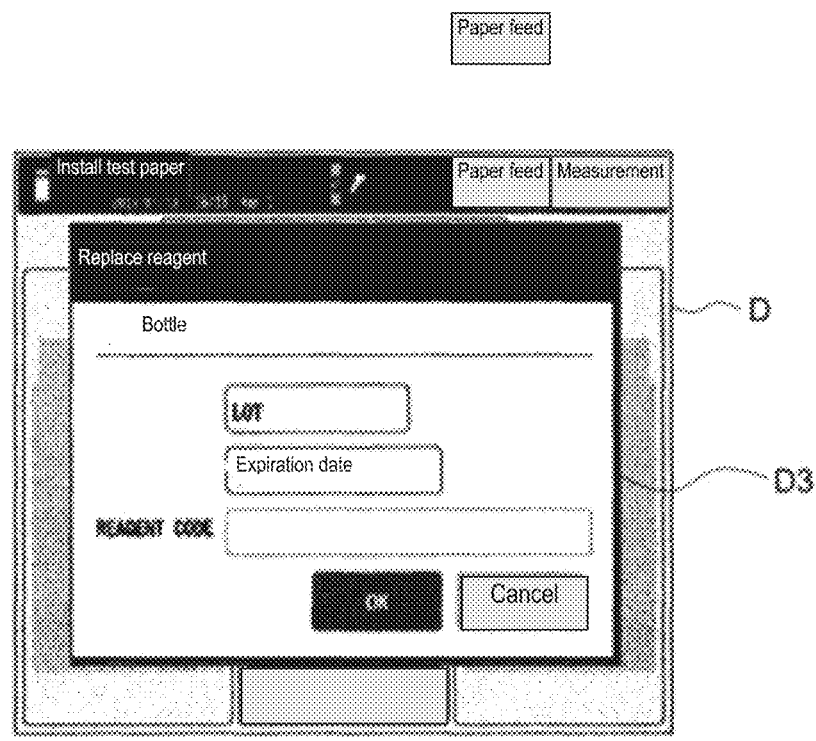
FIGS. 29C and 29D are diagrams showing an example of a display screen or pop-up display of the same embodiment.
Figure 29D:
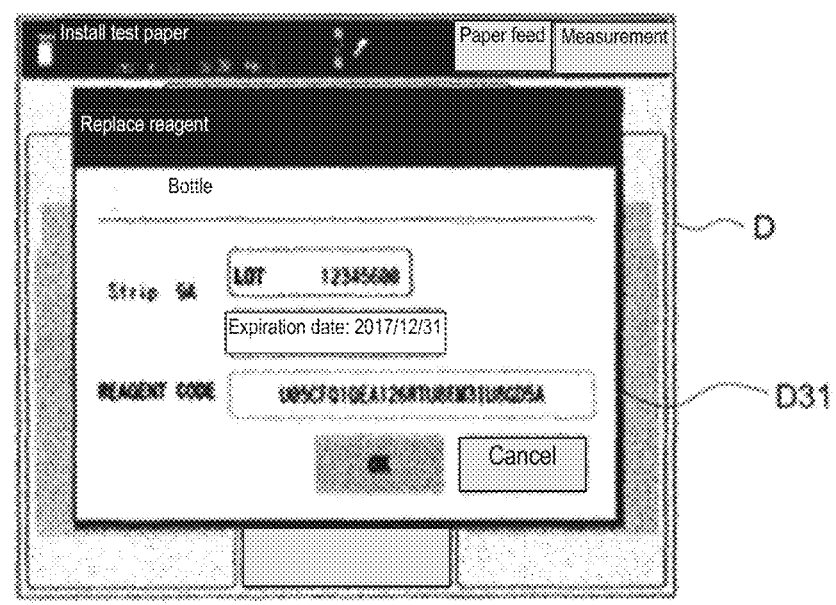

Next, in the present embodiment, whether an operator presses the "register" key in the reagent replacement pop-up D2 is detected ("register" key operation detected/not detected step). When the operation of the "registration" key by the operator is detected, a pop-up D3 for inputting an identification number (barcode as a specific example) is displayed on the display D (a display example of the barcode input pop-up D3 is shown in FIG. 29C). Then, the measuring apparatus Y of the present embodiment accepts input of test piece information (test piece type, lot number, expiration date) by a handheld bar code reader (test piece information input accepting step S102, see FIG. 27), and the input information is registered in a predetermined storage area and also displayed on the display D. An example of the pop-up D31 displaying the input test piece information is shown in FIG. 29D. In the flowchart of FIG. 27, the step of displaying the pop-up D2 for reagent replacement and the step of detecting whether the "registration" key is pressed are omitted. In the present embodiment, it is assumed that the barcode is printed on a container (a container different from the test piece storage container B shown in FIG. 3A) used in the shipping process to a site where the device is installed, such as a medical facility or the like, and the operator transfers the test piece P from the container used in the shipping process to the test piece container B with the opening and closing lid at the same time as the test piece registration processing or at an appropriate timing before or after the test piece registration processing.

In the test piece storage bottle mass-capacity model according to this embodiment, only one type of test piece P type or lot number is input in the measurement batch since there is no concept of a bottle rack. In the present embodiment, the number of test pieces and the serial number cannot be edited in the test piece information, and the time of registration is handled as 100 sheets. In the present embodiment, since the specification prohibits reuse of containers (test piece shipping bottles) used in the shipping process to medical facilities such as medical facility installation sites as a countermeasure against counterfeit products, the previously used test piece shipping bottles among the test piece shipping bottles (pre-test piece registration process) cannot be registered. Test piece shipping bottle registration is unnecessary for second and subsequent usage in the same measurement batch.

Figure 30E:
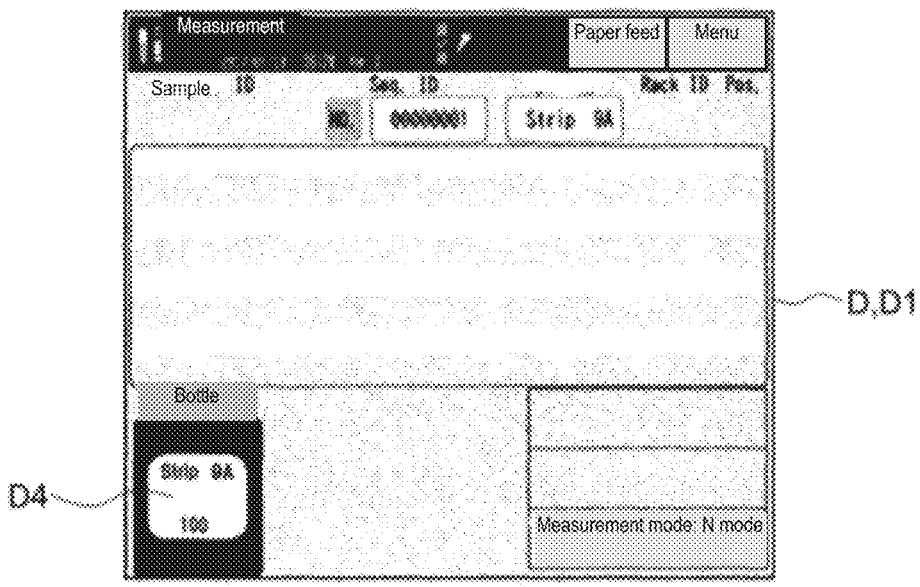
FIGS. 30E and 30F are diagrams showing an example of a display screen or pop-up display of the embodiment.
Figure 30F:
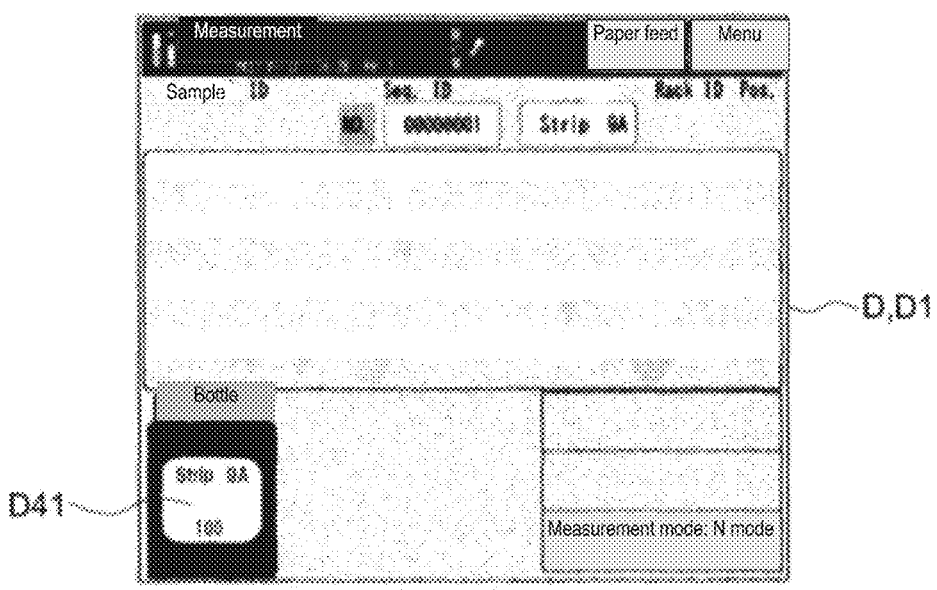

In the measuring apparatus Y of the embodiment, when the operation of the operator pressing the "OK" on the display D is detected ("OK" key operation detected/not detected in step S103, see FIG. 27) and the operation of the operator pressing the "OK" is accepted after displaying the test piece information received in the test piece information input acceptance step S102 on the display D, the display returns to the measurement screen (main screen D1) (main screen transition step S104) and the expiration date of the test piece P is checked (expiration date check step S105) based on the test piece information accepted in the test piece information input acceptance step S102 (Validity period check step S105). Note that, as shown in FIGS. 27 and 30E, the test piece storage container information D4 to be displayed on the main screen D1 of the display D is one piece, and as shown in FIGS. 27 and 30F, when the test piece P has expired, the test piece storage container information D41 is displayed with a conspicuous color (for example, orange) which is different from other characters. Through the above procedure, the test piece registration process is completed.

By performing such test piece registration processing, the test piece type, lot number and serial number are managed by unique identification information (barcode), the reuse of the used test piece shipping bottle is prohibited, and effective countermeasures for counterfeit products is achieved. In the present embodiment, information for the past 300 pieces is set to be stored in the apparatus.

Regarding the test piece registration, the measuring apparatus Y of the present embodiment is set to use only the test piece P of the same lot in one measurement batch, so that a new test piece shipping bottle cannot be registered until the measurement batch is completed.

As shown in FIG. 26, the measuring apparatus Y of the present embodiment carries out the measurement processing following the test piece registration processing. In the description of the measurement process below and in reference to FIG. 31, processing performed by each part and each mechanism of the test piece storage container continuous processing apparatus X is regarded as processing to be performed by "unit U", and the processing relating to the test piece take-out unit (test piece take-out mechanism) and the measuring unit of the measuring apparatus Y are regarded as processing to be performed by "device main body M", not unit U.

Figure 31:
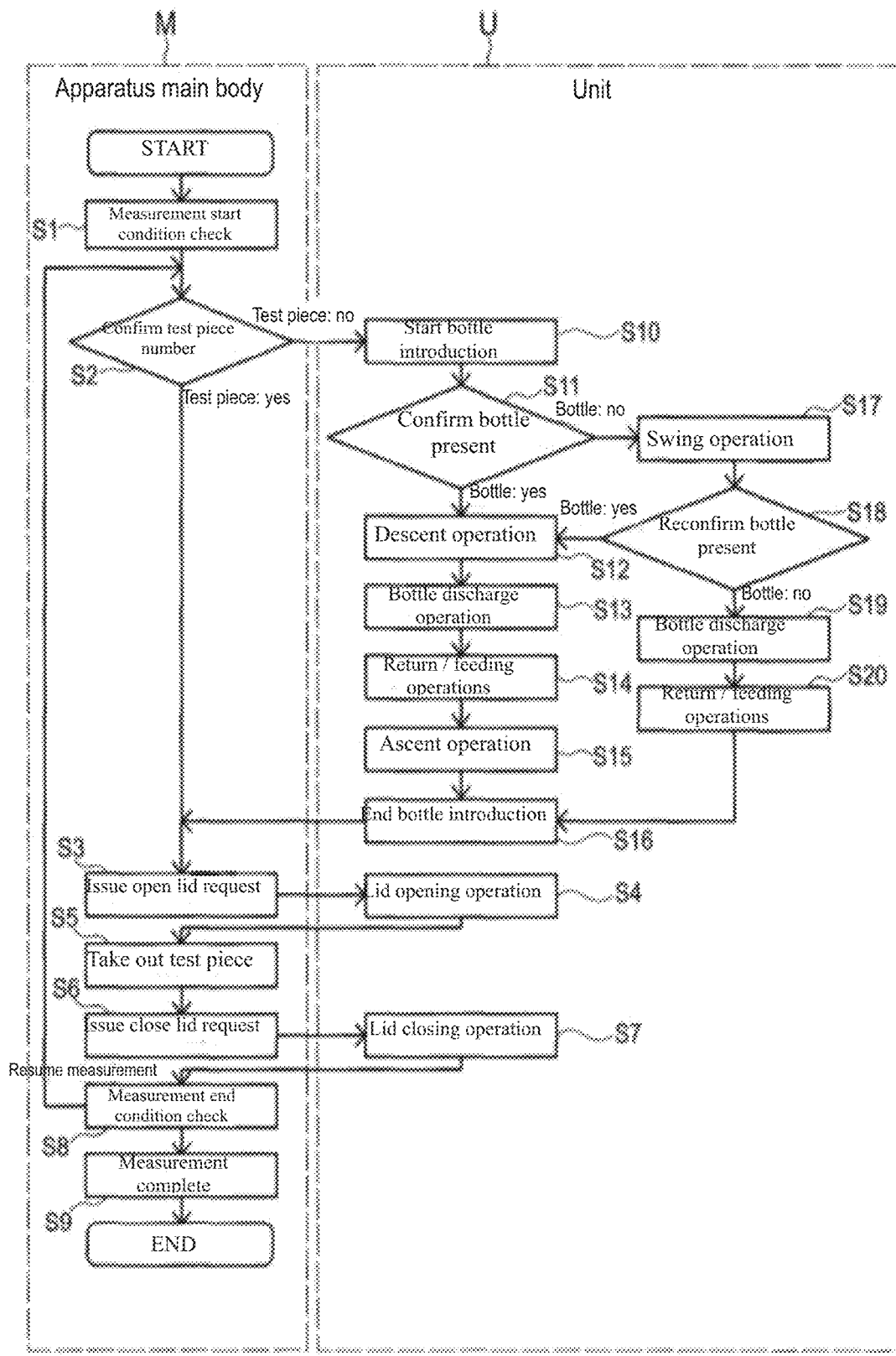
FIG. 31 is a flowchart of the measurement process according to the same embodiment.

In the measurement process, a measurement start condition is first checked on the apparatus main body M side (measurement start condition check step S1, see FIG. 31). In addition to detecting the operation input by the operator pressing the "Start/Stop" key, the measurement start condition of the present embodiment is that a test piece storage container B is disposed at the empty detection position of the introduction unit 5 (in this embodiment, a position capable of detecting the test piece storage container B that has reached the transfer case 72 set at the upper position in the secondary introduction unit 7) or test piece take-out position. Whether the test strip storage container B is at the empty detection position and the test piece take-out position of the introduction unit 5 can be specified based on the sensing information from the introduction unit empty sensor 51 and the take-out position container sensor 48. When the introduction unit empty sensor 51 does not detect the test piece storage container B at the empty detection position, the operator can be alerted that the test strip container B is not present at the empty detection position and urge the operator to replenish the test strip storage container B from the introduction starting end 11 of the introduction unit 5 by displaying, for example, "standby bottle empty" on the display D until a test piece storage container B is detected at the empty detection position.

In addition to the above conditions, in the present embodiment, a pop-up warning or the like of suitable text is shown on the display D so as not to start the measurement process when the test piece P to be used is not registered or when the collected test piece storage containers B fill the collection area 33. Whether the collected test piece storage containers B fill the collection area 33 can be specified based on the sensing information from the collection area full capacity sensor 30 described above.

In the present embodiment, following the measurement start condition checking process, a process of checking the number of test pieces in the test piece storage container B at the test piece take-out position (test piece number confirming step S2, see FIG. 31) is performed. This process is a process of checking the counter on software regarding the number of test pieces. When there is the test piece P (when the number of pieces is not zero), a signal requesting switching of the opening and closing cover B2 from the closed state to the open state is issued (lid opening request issuing step S3). Following the lid opening request issuing process, a process (lid opening step S4) of switching the opening and closing lid B2 from the closed state to the open state is performed by the lid opening unit 2, and following the lid opening process, a process (test piece take-out step S5) of removing the test piece P from the test piece storage container B is performed by the test piece takeout unit (test piece pick-up mechanism). As described above, in the present embodiment the test piece storage container B on the main transfer line L4 is in an inclined posture suitable for the test piece take-out process, and the inclined posture of the test piece storage container B is maintained during the lid opening process.

The test piece P taken out from the test piece storage container B is used for measurement processing on a test piece reaction line (not shown) set in the housing Y1 of the measurement apparatus Y. In the test piece take-out process of the present embodiment, it is assumed that 100 test pieces P are stored in each test piece storage container B, and the number of pieces is decremented (the value of the variable is decreased by 1) each time a test piece P is removed. Then, when the number of remaining test pieces becomes 0 or when the test piece P cannot be taken out with three re-attempts, the procedure shifts to a procedure after the lid closing request issuing step S6. Note that in order to minimize the time during which the test piece storage container B at the test piece take-out position is exposed to air, in the standby state the opening and closing lid B2 of the test piece storage container B is kept closed since there is no need to take out a test piece.

In the measuring apparatus Y of the present embodiment, a process (lid closing request issuing step S6) for issuing a signal requesting switching the opening and closing lid B2 from the open state to the closed state is performed after taking out a predetermined number of test pieces P, and a process of switching the opening and closing lid B2 from the open state to the closed state is performed by the lid opening unit 2 which also functions as a lid closing unit (lid closing step S7).

Following the lid closing process, the measuring apparatus Y of the present embodiment performs a measurement end condition checking process (measuring end condition checking step S8). The measurement end condition of this embodiment is to detect an operation input by an operator pressing the "Start/Stop" key. Then, when the measuring apparatus Y of the embodiment detects the operation input of the operator pressing the "Start/Stop" key, the measurement ends when there is no test piece P to be measured on the test piece reaction line without performing a new test piece take-out process (measurement end step S9). Note that when the measurement is completed, the introduced test piece storage container B on the introduction line (the first introduction line L6, the second introduction line L7) and main transfer line L4 are retained at that position. On the other hand, if the measurement end condition is not satisfied in the measurement end condition check process, the measurement is to be continued, and the process returns to the test piece number confirmation process (test piece number confirmation step S2).

When it is confirmed that there is no test piece P in the test piece number confirming process (when the number of pieces is zero), the measuring apparatus Y of this embodiment must move the succeeding test piece housing container B to the test piece take-out position, start the introduction of a test piece storage container B (bottle introduction start step S10), and perform a process of confirming whether the test piece storage container B is present in the introduction unit 5 (installed bottle confirmation step S11). The installed bottle confirmation process of the present embodiment, the test piece (s) is a process of confirming whether a test piece storage container B is present at the empty detection position (position at which the test strip container B received by the transfer case 72 set at the upper position in the secondary introduction unit 7 can be detected). Whether the test piece storage container B is in the empty detection position of the introduction unit 5 can be specified (confirmed) based on the sensing information by the introduction unit empty sensor 51 described above.

When a test piece storage container B is present at the empty detection position of the introduction unit 5, the measurement apparatus Y of the present embodiment performs a process of moving the transfer case 72 of the secondary introduction unit 7 from the upper position to the lower position (descent step S12), and subsequently starts the discharge operation (bottle discharge step S13) by the discharge unit 3 Note that through the initialization process described above the lever 41 of the main transfer unit 4 is at the feeding operation start position during the descent process. In this embodiment, the discharge operation is set to be performed irrespective of whether the test piece storage container B is present at the discharge preparation position. The discharging operation is a process of positioning the holding case 35 of the discharging unit 3 at the pre-discharge receiving position and then rotating and moving the holding case 35 from the pre-discharge receiving position to the vertical posture correction position following the return operation of the main transfer unit 4.

Following the discharge process, the measuring apparatus Y of the present embodiment carries out the return operation and the feeding operation of the main transfer unit 4 in order (return operation/feeding operation step S14), performs a process (ascent step S15) of moving the transfer case 72 of the secondary introduction unit 7 from the lower position to the upper position after the feeding operation of the main feeding unit 4, and ends the introduction of the test piece storage container B (test piece storage container introduction end step S16). Thereafter, the aforementioned lid opening request issuing process (lid opening request issuing step S3) is executed, and the subsequent processes are sequentially executed.

When the measuring apparatus Y of the present embodiment confirms that there is no test piece storage container B at the empty detection position of the introduction unit 5 in the installed bottle confirmation step S11, at this time a swinging process (swinging step S17) is performed to swing the transfer case 72 of the secondary introduction unit 7 positioned at the upper position in the vertical direction. As a result of this swinging process, the relative positional relationship between the transfer case and test piece storage container B which is not completely accommodated in the transfer case 72 due to being caught on a part of the transfer case 72 or the like is corrected, so that the test piece storage container B is completely accommodated in the transfer case 72.

Following the swinging process, the measuring apparatus Y of the present embodiment again executes the installed bottle confirmation process (introduced bottle present/absent checking step S18), and when it is confirmed that the test piece storage container B is present at the empty detection position of the introduction unit 5, descent process (descent step S12) is performed with respect to the secondary introduction unit 7, and the subsequent processes are sequentially performed thereafter. On the other hand, when it is confirmed that there is no test piece storage container B at the empty detection position of the introduction unit 5 in the recheck for installed bottles step S18, a discharge operation is performed by the discharge unit 3 (bottle discharge step S19), the return operation and the feeding operation of the main transfer unit 4 are carried out in the sequence (return operation/feeding operation step S20), introduction of the test piece storage container B is completed (bottle introduction end step S16), a lid opening request issuing process is executed (lid opening request issuing step S3), and subsequent processes are sequentially performed thereafter.

Figure 8:
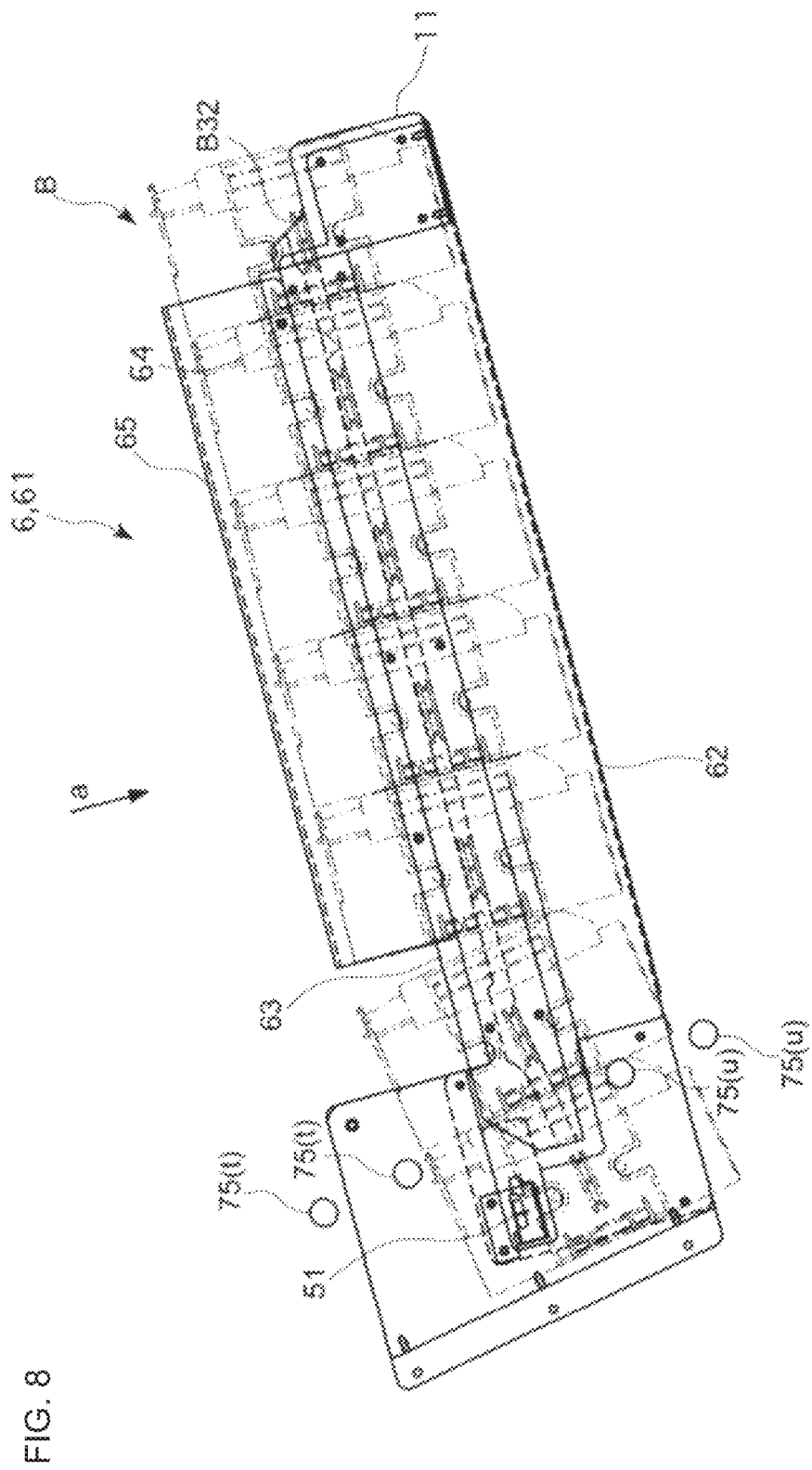
FIG. 8 is a side view partially omitting a primary introduction unit of the same embodiment.
Figure 9:
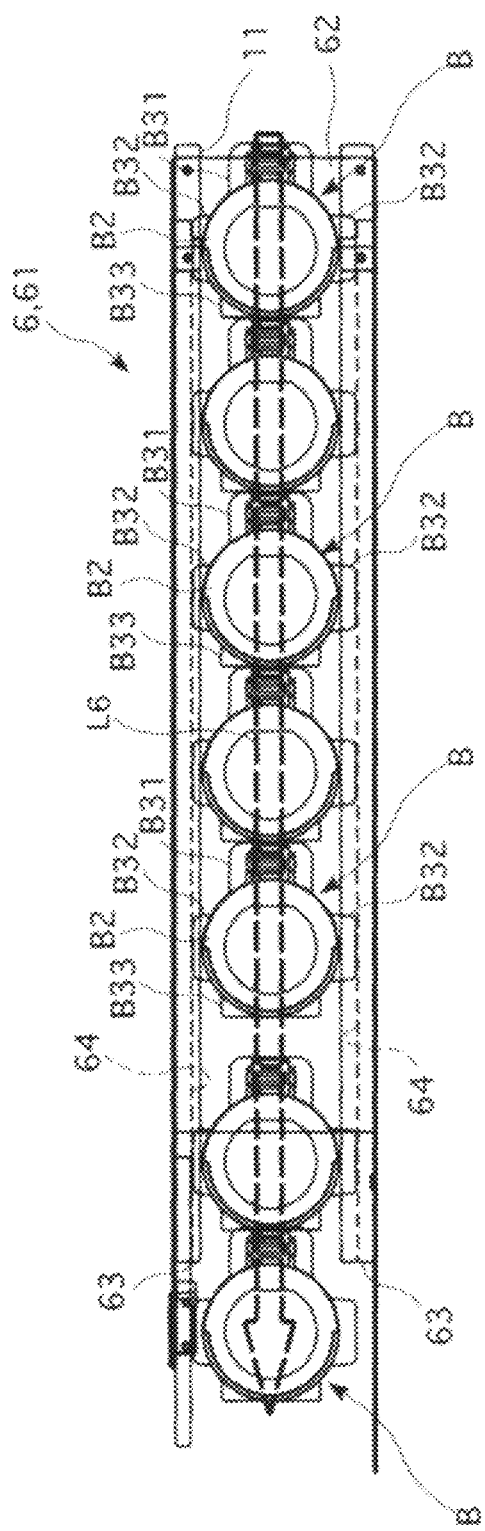
FIG. 9 shows a partial omission of a primary introduction unit as viewed from the direction a in FIG. 8.

Note that regarding the test piece storage container B, first, when the "bottle" key is pressed, a reagent replacement pop-up D2 (refer to FIG. 8 (b)) is displayed on the display D. When an operation of pressing "collection" on the display D by the operator is accepted, all the test piece storage containers B including the one already installed in the primary introduction unit 6 are forcibly discharged. Even when the test piece storage container B is collected, the test piece storage container information (test piece type, lot number, serial number, expiration date, number of pieces) used is retained.

As shown in FIG. 26, the measuring apparatus Y of this embodiment can stop and terminate various kinds of processing by performing shutdown process after completion of the measurement process of the scheduled number of samples.

Since there is a possibility that the test piece storage container B may remain inside, the measuring apparatus Y of the present embodiment also can be to set, as a pretreatment, to only perform a process to discharge a test piece storage container B disposed at the discharge preparation position from the discharge port 31 of the discharge unit 3 to the collection area 33 following power on and the initialization process.

According to the test piece storage container continuous processing apparatus X of the present embodiment described above, the operator can introduce the test piece storage containers B one after another from the introduction starting end 11 since it is set to be accessible from the outside relative to the introduction starting end 11 set outside the housing Y1 of the measuring apparatus Y. Since the test piece storage container continuous processing apparatus X according to the present embodiment is structured so that the introduced test piece storage container B can be transferred in one way from the introduction starting end 11 to the discharge opening 31, an introduction transfer process of transferring the test piece storage container B introduced from the introduction starting end 11 to a predetermined test piece takeout position in the housing Y1 by the introduction transfer unit 1, a lid closing process to switch the opening and closing lid B2 from the closed state to the open state by the lid opening unit 2 at the test piece takeout position, and a discharge process of discharging the test piece storage container B from which all or a predetermined number of accommodated test pieces P have been removed to the predetermined collection area 33 from the discharge port 31 by the discharge unit 3 can be performed, and can operate continuously as long as the test piece storage container B is present on the transfer line (primary introduction line L6, secondary introduction line L7, main transfer line L4) of the test piece storage container B by the introduction transfer unit 1.

Therefore, according to the test piece storage container continuous processing apparatus X according to the present embodiment, a problem that can occur in conventional apparatuses, that is, the problem of creating a time period during which the test piece P cannot be provided for the measurement process during the process of removing the test piece storage container B in the housing Y1 out of the housing Y1 and installing a new next test piece storage container B may occur such that a new test piece storage container B cannot be set in the housing Y1 from the time the operator once sets a plurality of test piece containers B in the housing Y1 of the measuring apparatus Y using a turntable or a bottle rack until processing of all the test piece sic, age containers B in the housing Y1 has been completed, can be solved and processing capacity and work efficiency are improved.

The test piece storage container continuous processing apparatus X according to the present embodiment, in which the introduction starting end 11 is set outside the housing Y1 of the measuring apparatus Y, increases the number of test piece storage containers B that can be set in the housing Y1, and is also advantageous in that it is unnecessary to adopt a design for enlarging the housing Y1 in order to increase the number of test piece storage containers B that can be set within the housing Y1.

In the test piece storage container continuous processing apparatus X according to the present embodiment, since the test piece storage container B with the opening and closing lid B2 is the processing object and the opening and closing lid B2 is switched from the closed state to the open state by the lid opening unit 2 at the test piece take-out position, the test piece storage container B can be maintained in a lid-sealed state until it reaches the test piece take-out position, the situation where the test piece P in the container is deteriorated due to exposure to the air can be prevented/suppressed, and the structure can be simplified because it is unnecessary to provide a dedicated holding lid in the housing Y1 of the measuring apparatus Y.

Since the test piece storage container continuous processing apparatus X according to the present embodiment is structured so as to be capable of transferring the test piece storage container B from the introduction starting end 11 to the discharge port 31 in a non-circulating one-way direction, it is possible to realize a smooth transfer process by simplifying the travel path.

The test strip container continuous processing apparatus X according to the present embodiment is configured by a main transfer unit 4 for transferring the test piece storage container B to at least the test piece take-out position along a main transfer line L4 on a straight line extending in the horizontal direction, and an introduction unit 5 for transferring the test piece storage container B introduced from the introduction starting end 11 to the starting end of the main transfer line L4 (transport start position of the test piece storage container B by the main transfer part 4), and the main transfer unit 4 is provided in the housing Y1. In view of the fact that the measuring apparatus Y is configured to remove the test piece P from the container body B1 of the test piece storage container B which is inclined by a predetermined angle at the test piece take-out position, the present embodiment is configured to move the test piece storage container B while maintaining the posture in which the test piece storage container B is inclined at a predetermined angle, so that during the process of transferring the test piece storage container B by the main transfer unit 4, the test piece storage container B can be smoothly and stably transferred in the housing Y1.

In the present embodiment, the main transfer unit 4 also is configured to transfer the test piece storage container B to the discharge preparation position set further downstream than the test strip take-out position in the transport direction A, and as the discharge unit 3, a posture changing unit 32 for changing the test piece storage container B from a posture inclined by a predetermined angle to a vertical posture when discharging the test piece storage container B disposed at the discharge preparation position to the discharge port 31, whereupon the test piece storage container B in a vertical posture is dropped from the discharge port 31 to the collection area 33. According to such a configuration, it is possible to maintain the posture of the test piece storage container B at the test piece take-out position in the inclined posture, and the test piece changed from the inclined posture to the vertical posture by the posture changing portion 32 at the discharge preparation position; the opening size of the discharge port 31 can be set to a minimum size according to the planar shape of the test piece storage container B in order to drop the storage container B from the discharge port 31 into the collection area 33, and can be set slightly smaller than the opening size of the discharge port 31 required to drop the test piece storage container B in the inclined posture. Even when the opening size of the discharge port 31 is set to be as small as possible within the range allowing passage of the test piece storage container B relative to the discharge port 31, the probability of the test piece storage container B being caught on the opening edge of the discharge port 31 during the discharge process is lower with the test piece storage container B in the vertical position than with the test piece storage container B in the inclined position.

Since the introduction unit 5 is configured by a primary introduction unit 6 for moving the test piece storage container B introduced to the introduction starting end 11 by its own weight, and a secondary introduction unit 7 for lowering the test piece storage container B which has finished the movement of the primary introduction part 6 to the transport start position of the test piece storage container B by the main transfer unit 4 in the present embodiment, the structure can be simplified by setting the primary introduction unit 6 to be a slide passage not requiring to be configured by a mechanical mechanism, and it is relatively easy to set the path length of the primary introduction unit 6 to a length that allows numerous test piece storage containers B to be installed. By adopting the design in which the first introduction unit 6, which is a relatively simple configuration, occupies most of the path length of the introduction unit 5 and the second introduction unit 7 occupies the remaining path length, the introduction unit 5, the path for moving the test strip container B by its own weight is relatively long, and it is possible to simplify the mechanism required to move the test piece storage container B in the introduction unit 5 compared with the configuration in which the path for moving the test piece storage container B by the mechanical mechanism is relatively long in the introduction unit 5.

Since the secondary introduction unit 7 of the present embodiment has the elevator mechanism 71 that lowers the test piece storage container B by the elevator system to the transport start position of the test piece storage container B by the main transfer unit 4, the elevator mechanism 71 makes it possible to minimize the fluctuation of the test piece storage container B during the descent process and at the end of the descent process, hence, realizing a stable transfer process.

The lid opening process can be appropriately performed on the opening and closing lid B2 of the test piece storage container B used in the present embodiment since the opening and closing lid B is configured to switch from the closed state to the open state by pressing the protrusion B25 protruding in a direction away from the center of the lid body B24 from above and rotating the lid body B24 around the hinge axis B23 in the opening and closing lid B2 in the closed state at the test piece take-out position. The lid opening unit 2 of the present embodiment also functions as a lid closing unit for switching the opening and closing lid B2 from the open state to the closed state, and when the test piece P remains in the test piece storage container B at the test piece take-out position at the end of the test piece take-out process, it is possible to prevent/suppress the situation where the test piece P in the test piece storage container B is exposed to the atmosphere by switching the opening and closing lid B2 of the test piece storage container B from the open state to the closed state. By switching the opening and closing lid B2 from the open state to the closed state after the end of the test piece take-out process at the test piece take-out position, the test piece storage container B is in a more compact form than when the opening and closing lid B2 is in the open state, and contributes to a smoother discharge process.

The test piece storage container continuous processing apparatus X according to the present embodiment functions as a bottle changer capable of sequentially switching the test piece storage container B reaching the test piece take-out position to the succeeding test piece storage container B by each unit of the primary introduction unit 6, secondary introduction unit 7, main transfer unit 4, lid opening unit 2, and the discharge unit 3. Such a test piece storage container continuous processing apparatus X can be assembled on a unit basis by partially modifying an existing measuring apparatus, and can perform continuous operation in which predetermined processes are successively performed on the test piece storage containers B continuously introduced from the introduction starting end 11 while keeping the configuration of the existing measuring apparatus Y within a possible range. In the test piece storage container continuous processing apparatus according to the present embodiment, the primary introduction unit 6, the secondary introduction unit 7, and the main transfer unit 4 configuring the introduction transfer unit 1 may be unitized so as to be handled as one aggregate body as shown in FIG. 4, and the introduction transfer unit 1, the lid opening unit 2, and the discharge unit 3 also may be unitized so that they can be handled as one aggregate body.

Note that the present invention is not limited to the above-described embodiment. For example, although the mode using the elevator mechanism is exemplified as the secondary introduction unit in the above-described embodiment, a mechanical mechanism other than the elevator mechanism, for example, a secondary introduction unit utilizing an escapement mechanism for sending test piece storage containers that have passed through the primary introduction line one by one toward the beginning of the main transfer line.

The number of test piece storage containers that can be installed can be appropriately changed, and the moving speed of the test piece storage container along the first introduction line can be regulated by appropriately changing the length and inclination angle of the introduction line (primary introduction line) of the test piece storage container by the primary introduction unit.

The present invention includes an apparatus in which the introduction starting end is set at an appropriate position other than the position shown in FIG. 1 or the like, insofar as the introduction starting end is set outside the housing of the measuring apparatus and the condition that it can be accessed from the outside of the apparatus is satisfied. Note that although it is conceivable to set the introduction starting end on the wall partitioning the inside and the outside of the housing and immediately transfer the test piece storage container introduced from the introduction starting end along the introduction line set in the housing, it is difficult to secure a long introduction line in the housing due to the large number of parts and mechanisms arranged therein.

When the introduction unit part of the test piece storage unit introduction line is formed by a linear primary introduction line and a linear secondary introduction line, the extension direction and inclination angle (pitch) of the primary introduction line and the secondary introduction line can be appropriately changed.

In the present invention, a configuration in which at least one of the primary introduction line and the secondary introduction line is a line configured in a nonlinear shape (curved, zigzag, helical and the like), and a configuration in which the primary introduction line and the secondary introduction line are continuous lines extending in a straight line may be used.

Apart or the entirety of the introduction line of the introduction unit also may be arranged in a straight line with the transfer line of the main transfer unit.

The introduction unit may be installable in a state in which the test piece storage containers are stacked in the height direction or installable in a posture in which the test piece storage container is horizontal. An introduction unit for allowing standby in the width direction of the measuring apparatus may be adopted rather than standby in the depth direction of the measuring apparatus.

In the present invention, a unit for transferring the test piece storage container by a mechanical mechanism over the entire or substantially the entire introduction line from the introduction starting end to the starting end of the main transfer line, or a unit for transferring the test piece storage container by its own weight over the entire or substantially the entire introduction line can be adopted as the introduction unit.

Such a unit can be applied as the introduction transfer unit of the present invention insofar as the test piece storage container introduced from the introduction starting end is transferred to at least a predetermined test piece take-out position, even if the configuration is such that the boundary between the introduction unit and the main transfer unit cannot be clearly distinguished. The introduction transfer unit may transport the test piece storage container introduced from a predetermined introduction starting end set outside the housing of the measuring apparatus to at least a predetermined test piece take-out position set outside the housing. That is, the present invention also encompasses a configuration in which the "predetermined test piece take-out position" is set at a predetermined position outside the housing of the measuring apparatus. In this case, it is also possible to provide a part or the entirety of the main transfer unit configuring the introduction transfer unit outside the housing of the measuring apparatus, or to provide a part or the entirety of the lid opening unit and the discharge unit outside the housing of the measuring apparatus.

Although a configuration in which the lever feeding operation is repeated three times to the test piece storage container introduced from the introduction unit to transfer it to the test piece take-out position has been used as an example of a main transfer unit in the above-described embodiment, the test piece storage container also may be transported to at least the test piece take-out position by a single lever feeding operation or a predetermined multiple number of lever feeding operations rather than three lever feeding operations.

In the present invention, the main transfer unit also may be configured to press the test piece storage container with an appropriate pressing part or pressing mechanism other than the lever to move the container to at least the test piece take-out position, or pull the test piece storage container by an appropriate pulling unit or tension mechanism to move the container to at least the test piece take-out position.

The main transfer unit also may move the test piece storage container to the test piece take-out position. In this case, the discharge unit performs an appropriate discharge process at the test piece take-out position, or performs an appropriate discharge process after moving the test piece storage container from the test piece take-out position to a predetermined position.

When the measuring apparatus is configured to remove the test piece from the container body of the test piece storage container which is inclined by a predetermined angle at the test piece take-out position, the timing to change the test piece storage container to the predetermined inclined posture is set at the time the test piece storage container reaches a predetermined position on the introduction line (primary introduction line, secondary introduction line) or a predetermined position on the main transfer line, or gradually changes the posture if the test piece storage container to the inclined position in the process of moving along the introduction line or main transfer line.

The present invention also includes a mode in which the discharge unit discharges the test piece storage container to the discharge port in a predetermined inclined posture. In this case, there is no need for a posture change unit for changing the test piece storage container from a posture inclined at the predetermined angle to a vertical posture.

When the measuring apparatus has a configuration to remove the test piece from the test piece storage container in the vertical posture at the test piece take-out position, the introduction transfer unit may transfer the test piece storage container in a vertical posture from the time of introduction to the introduction starting end until it reaches the test piece take-out position, or a test piece storage container introduced from the introduction starting end in a non-vertical posture may be changed to the vertical posture at a predetermined position and timing until the test piece storage container reaches the test piece take-out position.

The opening and closing lid also can be switched form the closed state to the open state by linearly moving all or a part of the opening and closing lid in a predetermined direction (stepless sliding movement or stepwise sliding movement in a predetermined pitch unit). The lid opening unit also may switch the opening and closing lid from the closed state to the open state at a predetermined position on the upstream side from the test piece take-out position in the transfer direction. In this case, the opening and closing lid is switched from the closed state to the open state at a time before reaching the test piece take-out position. Accordingly, the closer the position at which the opening and closing lid is switched from the closed state to the open state is to the test piece take-out position, the more advantageous it is to reducing the time the test piece is exposed to the atmosphere.

Although the lid opening unit also functions as the lid closing unit in the above-described embodiment, a dedicated lid closing unit also may be provided separately from the lid opening unit. The present invention also includes a configuration of discharging the opening and closing lid from the discharge port in the open state after the test piece take-out process, and in this case, the cover closing unit is unnecessary.

The mechanisms of the secondary introduction unit, the main transfer unit, the lid opening unit, and the discharge unit in the above-described embodiment are examples suitable for implementing the present invention, and the specific configuration of each mechanism can be appropriately changed and selected according to specification.

Although a test piece storage container in which an upper lid and the lower lid can be attached to a cylindrical body having inner space without bottom or lid has been described as an example in the above embodiment, the test piece storage container also may be configured by a body (container body) having an inner space with closed bottom and open only in the upper direction. In this case, the body is formed by integrating a body and a bottom part that functions as the lower lid, such that a body and separate dedicated lower lid is unnecessary.

The test piece storage container also may be configured so that the entirety of the opening and closing lid opens and closes relative to the container body. The shape, material and application of the test piece are also not particularly limited.

The continuous processing apparatus of the present invention can also be applied to a measuring apparatus that measures a liquid sample other than urine, for example, blood.

The specific configuration of each part is not limited to the above embodiment, and various modifications are possible without departing from the scope of the present invention.

What is claimed is:

1. A test piece storage container continuous processing apparatus configured to connect to a measuring apparatus, the apparatus comprising:
    an introduction transfer unit provided outside a housing of the measurement apparatus, the introduction transfer unit configured to transfer a test piece storage container from an introduction starting end to at least a test piece takeout position, wherein the measurement apparatus is configured to remove a test piece from the test piece storage container at the test piece take-out position to measure the test piece;
    a lid opening unit provided outside the housing of the measurement apparatus and connected with the introduction transfer unit and the discharge unit via a transfer path, the lid opening unit configured to switch a lid of the test piece storage container from a closed state to an open state at the test piece take-out position or at a position on an upstream side of the test piece take-out position in a transfer direction of the test piece storage container on the transfer path;
    a discharge unit provided on the transfer path, the discharge unit configured to discharge the test piece storage container that is devoid of the test piece to a discharge port;
    wherein the apparatus is configured such that the introduction starting end is accessible from the outside of the housing, and the test piece storage container is transportable in the transfer direction from the introduction starting end to the discharge port,
    wherein the test piece storage container comprises a container body having an internal space capable of storing a plurality of test pieces, and the lid which is changeable between an open state in which the internal space is open upward and a closed state in which the internal space is closed, and
    wherein the lid opening unit switches the lid from the closed state to the open state with the lid connected to the container body.

2. The test piece storage container continuous processing apparatus according to claim 1, wherein the introduction transfer unit is configured to:
    transfer the test piece storage container to at least the test piece take-out position; and
    transfer the test piece storage container introduced from the introduction starting end to a transport start position of the test piece storage container.

3. The test piece storage container continuous processing apparatus according to claim 2, wherein the introduction transfer unit is further configured to:
    transfer the test piece storage container while maintaining a posture of the test piece storage container inclined at a predetermined angle such that the test piece is removed by the measuring apparatus from the test piece storage container inclined at the predetermined angle.

4. The test piece storage container continuous processing apparatus according to claim 3, wherein
    the introduction transfer unit is configured to transfer the test piece storage container to a discharge preparation position set further downstream in the transport direction than the test piece take-out position; and
    the discharge unit is configured to change the test piece storage container from the posture inclined by the predetermined angle to a vertical posture when discharging the test piece storage container reached at the discharge preparation position to the discharge port, wherein the test piece storage container in the vertical posture is dropped from the discharge port to a predetermined collection area.

5. The test piece storage container continuous processing apparatus according to claim 2, wherein the introduction transfer unit is further configured to:
    transfer the test piece storage container set at the introduction starting end by a weight of the test piece storage container; and
    lower the transferred test piece storage container.

6. The test piece storage container continuous processing apparatus according to claim 5, wherein the introduction transfer unit is configured to:
    lower the test piece storage container to the transport start position of the test piece storage container using an elevator mechanism.

7. The test piece storage container continuous processing apparatus according to claim 1, wherein
    the lid comprises a tubular part that can be fitted to an upper end part of the container body, and a lid main body that is rotatably connected to the tubular part via a hinge shaft;
    wherein the lid opening unit switches the lid from the closed state to the open state by pressing a protrusion part protruding from above in a direction away from a center portion of the lid body and rotating the lid main body around the hinge shaft.

8. The test piece storage container continuous processing apparatus according to claim 1, wherein
    the lid opening unit switches the lid from the closed state to the open state at the test piece take-out position.

9. The test piece storage container continuous processing apparatus according to claim 1, wherein
    the introduction starting end is disposed in front of the housing of the measuring apparatus.

10. The test piece storage container continuous processing apparatus according to claim 2, wherein:
    a guide flange is provided at an outer circumferential surface of the test piece storage container; and
    a guide rail groove provided in the introduction transfer unit, wherein the guide flange of the test piece storage container is provided in the guide rail groove.

11. A measuring system comprising:
    the test piece storage container continuous processing apparatus according to claim 1; and
    a measuring apparatus for removing the test piece from the test piece storage container transported by the test piece storage container continuous processing apparatus, and performing measurement processing.

12. The measuring system according to claim 11, wherein the measuring apparatus is configured to measure a urine sample using the test piece.

13. A test piece storage container continuous processing method comprising:
    an introduction step of introducing a test piece storage container provided with a lid from an introduction starting end set outside a housing of a measurement apparatus performing a measurement processing using a test piece;
    a transfer step of transferring the test piece storage container introduced from the introduction starting end to at least a test piece take-out position by an introduction transfer unit;
    a switching step of switching the lid from a closed state to an open state by a lid opening unit at the test piece take-out position or a position on the upstream side of the test piece take-out position in a transfer direction of the test piece storage container on a transfer path;

a discharge step of discharging the test piece storage container without the test piece to a discharge port by a discharge unit; and wherein the introduction starting end is set to be accessible from outside of the housing and the test piece storage container is transported in the transfer direction from the introduction starting end to the discharge port, and wherein, in the introduction step, the test piece storage container is introduced to the transfer path from a front of the housing of the measurement apparatus.

14. The test piece storage container continuous processing method according to claim 13, wherein the transfer step comprises:

a step of transferring the test piece storage container by a weight of the test piece storage container, and a step of transporting the transferred test piece storage container to the test piece take-out position.

15. The test piece storage container continuous processing method according to claim 13, wherein, in the switching step, the lid is switched from the closed state to the open state at the test piece take-out position.

16. The test piece storage container continuous processing method according to claim 13, wherein in the transfer step, the test piece storage container is transferred while guiding a circumferential direction of the test piece storage container in a predetermined direction.

17. A measuring method in which a test piece is removed from a test piece storage container transported by the test piece storage container continuous processing method according to claim 13, wherein the measuring method comprises:

performing, by the measurement apparatus, a measurement processing after removing the test piece from the test piece storage container at the test piece take-out position.

18. The measuring method according to claim 17, wherein the measurement processing is a process of measuring a urine sample using the test piece.

* * * * *